(12) United States Patent
Karaoguz et al.

(10) Patent No.: US 8,111,617 B2
(45) Date of Patent: Feb. 7, 2012

(54) MULTIPLE INDEPENDENT PATHWAY COMMUNICATIONS

(75) Inventors: Jeyhan Karaoguz, Irvine, CA (US); Nambirajan Seshadri, Irvine, CA (US); James D. Bennett, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 631 days.

(21) Appl. No.: 11/092,933

(22) Filed: Mar. 29, 2005

(65) Prior Publication Data

US 2006/0034184 A1 Feb. 16, 2006

Related U.S. Application Data

(60) Provisional application No. 60/601,393, filed on Aug. 13, 2004.

(51) Int. Cl.
*G06F 11/00* (2006.01)
(52) U.S. Cl. ........................................................ 370/228
(58) Field of Classification Search .............. 370/331, 370/332, 333, 312, 216, 217, 221, 225, 228, 370/310–35, 335, 336; 714/746, 780
See application file for complete search history.

(56) References Cited

U.S. PATENT DOCUMENTS

| | | | |
|---|---|---|---|
| 6,061,573 A * | 5/2000 | Goldberg ...................... 455/503 |
| 6,300,364 B1 | 10/2001 | Shimokawa et al. |
| 6,735,168 B1 | 5/2004 | Schnell et al. |
| 7,023,810 B1 * | 4/2006 | Moon ............................ 370/252 |
| 2002/0161851 A1 | 10/2002 | Chang |
| 2003/0009589 A1 | 1/2003 | Apostolopoulos et al. |
| 2003/0169713 A1 * | 9/2003 | Luo ................................ 370/338 |
| 2004/0023669 A1 * | 2/2004 | Reddy ......................... 455/456.1 |
| 2004/0137901 A1 * | 7/2004 | Hamasaki et al. ............. 455/436 |
| 2004/0151136 A1 * | 8/2004 | Gage .............................. 370/328 |
| 2004/0223553 A1 * | 11/2004 | Kumar ........................... 375/259 |
| 2007/0217366 A1 * | 9/2007 | Sagi et al. ...................... 370/331 |

OTHER PUBLICATIONS

European Search Report corresponding to European Patent Application No. 05011271.3-1244, dated Feb. 15, 2008, 3 pages.

* cited by examiner

*Primary Examiner* — Kwang B Yao
*Assistant Examiner* — Kenan Cehic
(74) *Attorney, Agent, or Firm* — Brinks Hofer Gilson & Lione

(57) ABSTRACT

A system and method for utilizing multiple independent communication pathways for communication. Various aspects of the present invention may comprise receiving a first signal directly from a first communication network, where the first signal communicates a unit of information. A second signal may be received from a second communication network, where the second signal communicates the unit of information. The received first and second signals may be processed to determine the unit of information. For example, respective indications of reliability may be determined and utilized to select between the units of information determined from the first and second signals. Also for example, such indications of reliability may be utilized to calculate the unit of information (e.g., based on a weighted averaging technique). Also for example, the unit of information determined from the first signal may be utilized to determine the unit of information from the second signal.

26 Claims, 7 Drawing Sheets

MULTIPLE INDEPENDENT PATHWAY COMMUNICATIONS

CROSS-REFERENCE TO RELATED APPLICATIONS/INCORPORATION BY REFERENCE

This patent application is related to and claims priority from provisional patent application Ser. No. 60/601,393, filed Aug. 13, 2004, and titled "MULTIPLE INDEPENDENT PATHWAY COMMUNICATIONS," the contents of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Various communication systems may utilize a single communication path to communicate information. Such communication may be limited by the communication environment along the single communication path. For example, a communication network of the single communication path may experience partial or full failure. Also for example, a communication network of the single communication path may experience periods of degraded performance, for example, due to varying network utilization or environmental conditions.

In various communication scenarios, a communication system may roam through respective coverage areas of various communication networks. For example, a communication system may initially communicate relatively well in a communication network. Then the communication system may be relocated to a different geographical location or physical orientation, and the quality of communication between the communication system and the communication network may be degraded.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for utilizing multiple independent communication pathways for communication, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Figure 1:
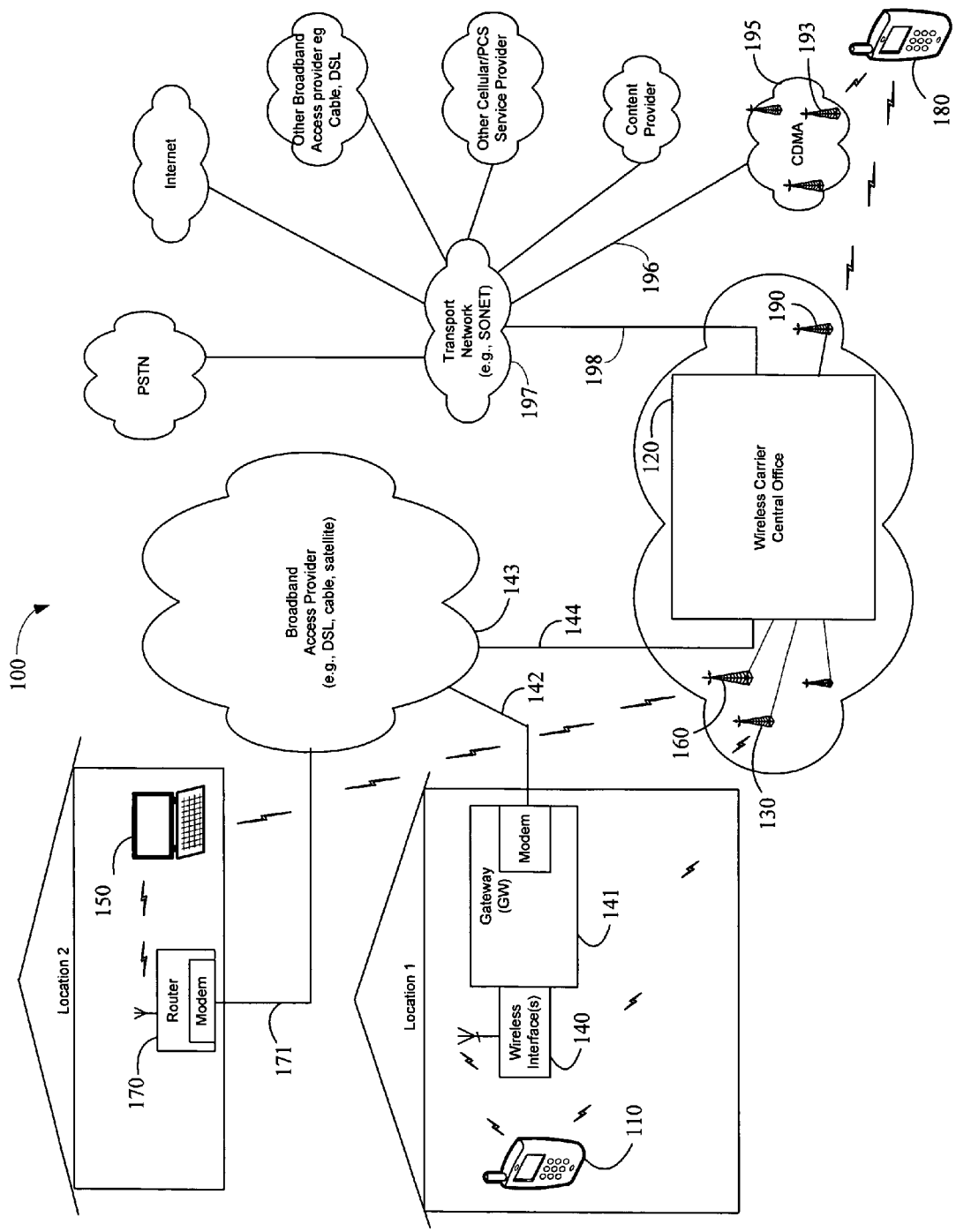
FIG. 1 shows a diagram of an exemplary multiple network communication environment, in accordance with various aspects of the present invention.

FIG. 1 shows a diagram of an exemplary multiple network communication environment 100, in accordance with various aspects of the present invention. The exemplary communication environment 100 may be referred to in the following discussion to provide exemplary illustrations of various aspects of the present invention. By no means, is the scope of various aspects of the present invention to be limited by characteristics of the exemplary communication environment 100.

The exemplary communication environment 100 may comprise a first communication system 110 (e.g., a portable communication device). Though the first communication system 110 is generally illustrated as a portable handheld communication device, the first communication system 110 may comprise characteristics of any of a variety of communication systems. For example and without limitation, the first communication system 110 may comprise characteristics of a cellular phone, paging device, portable multi-media communication device, pocket computer, personal digital assistant, portable telephone, desktop or portable computer, etc. Accordingly, the scope of various aspects of the present invention should not be limited by characteristics of a particular communication system.

The exemplary communication environment 100 may comprise a wireless carrier central office 120 that, for example, manages routing information and communicating information through various communication networks (including, e.g., a wireless network) with other communication systems. The following discussion may refer to the wireless carrier central office 120 as an example of a system with which other communication systems may communicate information. However, various aspects of the present invention should not be limited by characteristics of a particular communication system.

The first communication system 110 may comprise the capability to communicate information over a plurality of communication paths (e.g., with a plurality of communication networks). A communication path may generally be defined as a route that information (or data) travels between one communication system and one or more other communication systems. A communication path may comprise any of a variety of communication path characteristics. For example and without limitation, a communication path may comprise a direct link between communication systems or may comprise one or more intervening communication networks between communication systems.

For example, a first communication path of the plurality of communication paths may comprise a first communication network, and a second communication path of the plurality of information communication paths may comprise a second communication network in place of at least a portion of the first communication network. In a non-limiting exemplary scenario, a first communication path of a plurality of information communication paths may comprise a telecommunication network, and a second communication path of the plurality of information communication paths may comprise a computer communication network in place of at least a portion of the telecommunication network. In the non-limiting exemplary scenario, the first communication path may comprise utilizing a telecommunication network to provide the entire communication path between first and second communication systems, and the second communication path may utilize a computer network to communicate between the first communication system and a central switch of the telecommunication network and utilize the telecommunication network to communicate information between the central switch and the second communication system. The scope of various aspects of the present invention should not be limited by characteristics of any particular path (or set of communication networks) through which information may flow between systems.

In the exemplary communication environment 100, the first communication system 110 is communicatively coupled to the wireless carrier central office 120 through two communication paths. The first communication path comprises a wireless interface 130 (e.g., a base transceiver subsystem of the wireless carrier infrastructure) between the first communication system 110 and the wireless carrier central office 120. The second communication path comprises a local wireless interface 140 between the first communication system 110 and a local gateway 141. The local wireless interface 140 and local gateway 141 may, for example and without limitation, be part of a local communication system (e.g., a local telecommunication system or local area computer network) such as might be found at a workplace.

The gateway 141 may comprise a modem and be communicatively coupled through communication link 142 to a broadband communication network 143. The broadband communication network 143 may, for example and without limitation, comprise characteristics of a cable, DSL or satellite broadband access provider. The broadband communication network 143 may be coupled through communication link 144 to the wireless carrier central office 120.

Communication links 142 and 144 (and other communication links of the exemplary communication environment 100) may comprise characteristics of any of a variety of communication link types. For example and without limitation, communication links 142 and 144 may utilize any of a variety of communication media (e.g., wired, wireless, tethered optical, non-tethered optical, etc.). Also for example, communication links 142 and 144 may be based on any of a variety of communication standards or protocols. The scope of various aspects of the present invention should not be limited by characteristics of any particular communication link type.

The first communication system 110 may communicate message information with the wireless carrier central office 120 over either of the described first or second communication paths (e.g., through the wireless interface 130 and coupled wireless communication network; or the local wireless interface 140 and coupled computer network). Note that though the exemplary first communication system 110 is illustrated as communicating over two different communication paths and associated networks, the first communication system 110 may also comprise the capability to communicate over more than two different communication paths and associated networks.

The exemplary communication environment 100 also comprises a second communication system 150 (e.g., a portable e-mail device, pocket computer, desktop computer, or laptop with multi-network communication capability) that comprises the capability to communicate information over a plurality of communication paths (e.g., with a plurality of communication networks).

In the exemplary communication environment 100, the second communication system 150 is communicatively coupled to the wireless carrier central office 120 through two communication paths. The first communication path comprises a wireless interface 160 (e.g., a base transceiver subsystem of the wireless carrier's infrastructure) between the second communication system 150 and the wireless carrier central office 120. The second communication path comprises a local wireless interface 170 (e.g., comprising a wireless router and modem). The local wireless interface 170 may, for example and without limitation, be part of a home or personal communication system (e.g., a home-centric telecommunication system or personal area computer network) such as might be found in the home.

The local wireless interface 170 may comprise a modem and may be communicatively coupled through communication link 171 to the broadband communication network 143 discussed previously. The broadband communication network 143 may, in turn, be communicatively coupled through communication link 144 to the wireless carrier central office 120. As with communication links 142 and 144 discussed previously, communication link 171 may comprise characteristics of any of a variety of communication link types.

The second communication system 150 may communicate information with the wireless carrier central office 120 over either of the described first or second communication paths. Note that although the exemplary second communication system 150 is illustrated as communicating over two different communication paths and associated networks, the second communication system 150 may also comprise the capability to communicate over more than two different communication paths and associated networks.

The exemplary communication environment 100 also comprises a third communication system 180 (e.g., a cellular phone) that comprises the capability to communicate information over a plurality of communication paths.

In the exemplary communication environment 100, the third communication system 180 is communicatively coupled to the wireless carrier central office 120 through two communication paths. The first communication path comprises a wireless interface 190 (e.g., a base transceiver subsystem of the wireless carrier's infrastructure) between the third communication system 180 and the wireless carrier central office 120. The second communication path comprises a wireless interface 193 of a CDMA network 195, which is in turn, communicatively coupled to a transport network 197 through communication link 196. The transport network 197 may then, for example, be communicatively coupled to the wireless carrier central office 120 through communication link 198. As with communication links 142, 144 and 171 discussed previously, communication links 196 and 198 may comprise characteristics of any of a variety of communication link types.

The third communication system 180 may communicate information with the wireless carrier central office 120 over either of the described first or second communication paths. Note that although the exemplary third communication system 180 is illustrated as communicating over two different communication paths and associated networks, the third communication system 180 may also comprise the capability to communicate over more than two different communication paths and associated networks.

At this point, it is again stressed that the exemplary communication environment 100 is merely exemplary and will be referred to in the following discussion to provide specific examples of generally broader aspects of the present invention. Accordingly, the scope of various aspects of the present invention should not be limited by characteristics of the exemplary communication environment 100.

Figure 2:
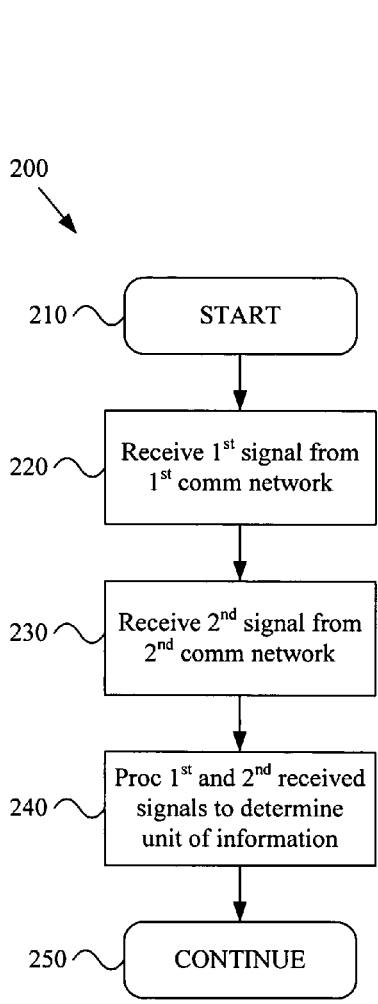
FIG. 2 shows a flow diagram of an exemplary method, in a communication system, for receiving information through multiple communication paths, in accordance with various aspects of the present invention.

FIG. 2 shows a flow diagram of an exemplary method 200, in a communication system, for receiving information through multiple communication paths, in accordance with various aspects of the present invention. As explained previously, a communication system may comprise characteristics of any of a variety of communication systems (e.g., portable or handheld communication systems). For example and without limitation, a communication system may comprise characteristics of a cellular phone, paging device, portable multimedia communication device, pocket computer, personal digital assistant, portable telephone, desktop or portable computer, etc. Accordingly, the scope of various aspects of the present invention should not be limited by characteristics of a particular communication system.

Note that many of the following exemplary illustrations utilize two-signal scenarios to illustrate various aspects of the present invention. It should be recognized that two-signal scenarios were chosen for the sake of illustrative clarity. Accordingly, the scope of various aspects of the present invention should not be limited by characteristics of various two-signal scenarios. For example, the various two-signal illustrations may be readily extended to three-signal or n-signal scenarios.

The exemplary method 200 may begin at step 210. The exemplary method 200, and all methods discussed herein, may begin for any of a variety of reasons. For example and without limitation, the method 200 may begin executing when a communication system that is implementing the method 200 resets or powers up. Further for example, the method 200 may begin upon a user command (e.g., an explicit command that causes the communication system to communicate). Accordingly, the scope of various aspects of the present invention should not be limited by characteristics of any particular initiating event or condition.

The exemplary method 200 may, at step 220, comprise receiving a first signal directly (i.e., without an intervening communication network) from a first communication network, where the first signal communicates information. Such information may, for example, comprise one or more units of information, where a "unit of information" is generally a quantifiable amount of information. For example and without limitation, a unit of information may be a packet, bit, symbol, data frame, message, song, program, music video, movie, timed segment of a communication, etc. Such information may comprise characteristics of any of a variety of types of information (e.g., textual, graphical, multi-media, video, audio, pictorial, general data, etc.). The scope of various aspects of the present invention should not be limited by characteristics of a particular type of information or by any arbitrary notion of what a unit of such information may comprise.

The first communication network may comprise characteristics of any of a variety of communication network types. For example and without limitation, the first communication network may comprise a telecommunication network, television network or a computer network. The first communication network may, for example, comprise a relatively small area network, for example, a personal area network ("PAN") or local area network ("LAN"). Also, the first communication network may, for example, comprise a relatively large area network, for example, a metropolitan area network ("MAN"), national communication network or worldwide communication network (e.g., the Internet or various satellite communication networks). The first communication network may be a portion of (or all of) a first communication path between communicating systems. For example, as discussed previously, a communication path may comprise one or more communicatively coupled communication networks.

Referring briefly to the exemplary communication environment 100 illustrated in FIG. 1, the first communication system 110 may receive a first signal directly from wireless interface 130 of the wireless carrier's communication infrastructure, where the first signal communicates a unit of information (e.g., a segment of a telephone call). Also for example, the second communication system 150 may receive a first signal directly from the local wireless interface 170 of a personal area network, where the first signal communicates a unit of information (e.g., a song). Further for example, the third communication system 180 may receive a first signal directly from a wireless access point 193 of the CDMA network 195, where the first signal communicates a unit of information (e.g., a video image).

Generally, the first communication network may comprise characteristics of any of a variety of communication network types. Accordingly, the scope of various aspects of the present invention should not be limited by characteristics of a particular communication network type.

The first signal may comprise characteristics of any of a variety of communication signal types. For example and without limitation, the first signal may be communicated over any of a variety of communication media (e.g., wired, wireless, tethered optical, non-tethered optical, etc.). Also for example, the first signal may communicate information (e.g., a unit of information) using any of a large variety of encoding strategies, modulation techniques, compression techniques, communication protocols, etc. In a non-limiting exemplary scenario, the first signal may comprise a wireless signal communicated utilizing the IEEE 802.11 communication standard that communicates video information compressed in accordance with MPEG-4, part 10, which is encrypted utilizing public/private key encryption. In another non-limiting exemplary scenario, the first signal may comprise a wireless signal communicated utilizing the GSM communication standard that communicates cellular telephone information.

In general, the first signal may comprise characteristics of any of a variety of communication signal types. Accordingly, the scope of various aspects of the present invention should not be limited by characteristics of any particular communication signal type.

Step 220 may, for example, comprise receiving the first signal utilizing a receiver. Such a receiver may comprise characteristics of any of a variety of receiver types. For example and without limitation, the receiver may comprise characteristics of a wired, wireless or optical receiver. Also for example, the receiver may be adapted to communicate information communicated utilizing any of a variety of communication protocols or standards. The receiver may, for example, be associated with an antenna (or other signal port) coupled to the receiver. The scope of various aspects of the present invention should not be limited by characteristics of any particular type of receiver or other apparatus that may receive a signal that communicates information.

The exemplary method 200 may, at step 230, comprise receiving a second signal directly from a second communication network (e.g., substantially different than the first communication network), where the second signal communicates information (e.g., the unit of information discussed previously with regard to the first signal). For example, the second signal may generally communicate the same unit of information that the first signal (e.g., received at step 220) communicates. Note, however, that communicating a same unit of information does not necessarily comprise communicating the same data. For example and without limitation, a unit of information may be communicated with a variety of data resolutions (e.g., spatial, color, intensity and/or temporal resolutions, etc.). Also for example, a unit of information may be communicated utilizing a variety of data compression techniques and/or encoding strategies.

As discussed above, the first and second signals may each communicate at least a portion of the same unit of information. Note that the first and second signals may also communicate information that identifies the unit of information (or portion thereof) that is communicated. For example and without limitation, each of the first and second signals may communicate data packets or frames comprising header information that identifies the particular unit of information being communicated. Such identification information may, for example and without limitation, comprise timestamp information, sequence information, data identification information, etc. In a non-limiting exemplary scenario, the first signal may communicate a unit of information along with header information identifying the unit of information, and the second signal may communicate the same unit of information along with at least a portion of the same header information identifying the unit of information.

As with the first communication network, the second communication network may comprise characteristics of any of a variety of communication network types. The second communication network may be a portion of (or all of) a second communication path between communicating systems. Note that the second communication path may share one or more communication networks (or portions thereof). For example, the second communication network may be communicatively coupled (directly or indirectly) with the first communication network discussed previously.

Referring briefly to the exemplary communication environment 100 illustrated in FIG. 1, the first communication system 110 may receive a second signal directly from local wireless interface 140 of, for example, an office LAN, where the second signal communicates a unit of information (e.g., a segment of a telephone call). For example and without limitation, the first signal (received from wireless interface 130, discussed previously) and the second signal may each communicate at least a portion of the same unit of information (e.g., the same segment of a telephone call).

Also for example, the second communication system 150 may receive a second signal directly from wireless interface 160 of the wireless carrier's communication infrastructure, where the second signal communicates a unit of information (e.g., a song). For example and without limitation, the first signal (received from the local wireless interface 170, discussed previously) and the second signal may each communicate at least a portion of the same unit of information (e.g., the same song or a portion thereof).

Further for example, the third communication system 180 may receive a second signal directly from a wireless access point 190 the wireless carrier's communication infrastructure, where the second signal communicates a unit of information (e.g., a video image). For example and without limitation, the first signal (received from the wireless access point 193 of the CDMA network 195, discussed previously) and the second signal may each communicate at least a portion of the same unit of information (e.g., the same video image).

Generally, the second communication network may comprise characteristics of any of a variety of communication network types. Accordingly, the scope of various aspects of the present invention should not be limited by characteristics of a particular communication network type.

As with the first signal, discussed previously with regard to step 220, the second signal may comprise characteristics of any of a variety of communication signal types. For example and without limitation, the second signal may be communicated over any of a variety of communication media (e.g., wired, wireless, tethered optical, non-tethered optical, etc.). Also for example, the second signal may communicate information (e.g., a unit of information) using any of a large variety of encoding strategies, modulation techniques, compression techniques, communication protocols, etc. In a non-limiting exemplary scenario, the second signal may comprise a wireless signal communicated utilizing the IEEE 802.11 communication standard that communicates video information compressed in accordance with MPEG-4, part 10, which is encrypted utilizing public/private key encryption. In another non-limiting exemplary scenario, the second signal may comprise a wireless signal communicated utilizing the GSM communication standard that communicates cellular telephone information.

In general, the second signal may comprise characteristics of any of a variety of communication signal types. Accordingly, the scope of various aspects of the present invention should not be limited by characteristics of any particular communication signal type.

Step 230 may, for example, comprise receiving the second signal utilizing a receiver. Such a receiver may comprise characteristics of any of a variety of receiver types. For example and without limitation, the receiver may comprise characteristics of a wired, wireless or optical receiver. Also for example, the receiver may be adapted to communicate information communicated utilizing any of a variety of communication protocols or standards. The receiver may, for example, be independent of a receiver utilized to receive the first signal at step 220. Alternatively, for example, the receiver may share one or more components with a receiver utilized to receive the first signal at step 220. The receiver may, for example, be associated with an antenna (or other signal port) coupled to the receiver. The scope of various aspects of the present invention should not be limited by characteristics of any particular type of receiver or other apparatus that may receive a signal that communicates information.

The exemplary method 200 may, at step 240, comprise processing the received first signal and the received second signal to determine the information (e.g., a unit of information) communicated by the first and second signals received at steps 220 and 230. Step 240 may comprise processing the received first and second signals in any of a variety of manners, non-limiting examples of which are presented below.

Note that to perform various aspects of processing the first signal and the received second signal, the exemplary method 200 may comprise buffering one or both of the received first signal (or information representative thereof) and the received second signal (or information representative thereof). Such buffering may be utilized, for example and without limitation, to compensate for timing issues related to receipt and/or processing of the first and second signals.

In a first non-limiting exemplary scenario, step 240 may comprise processing the first signal to determine the unit of information, and determining a first indication of reliability for the unit of information determined from the first signal. Step 240 may then comprise processing the second signal to determine the unit of information, and determining a second indication of reliability for the unit of information determined from the second signal. Step 240 may then comprise determining the unit of information based, at least in part, on the determined first and second indications of reliability.

Continuing the exemplary scenario, step 240 may, for example, comprise determining the unit of information by selecting, either the unit of information determined from the first signal or the unit of information determined from the second signal, based at least in part on the respective indications of reliability. Alternatively, for example, step 240 may comprise determining the unit of information by combining the unit of information determined from the first signal and the unit of information determined from the second signal. Such combining may, for example and without limitation, be based at least in part on a weighting technique related to the respective indications of reliability.

In a second non-limiting exemplary scenario, step 240 may comprise processing the received first signal to determine the unit of information as communicated by the first signal. Step 240 may then comprise processing the received second signal to determine the unit of information by utilizing the unit of information determined from the first signal to determine the unit of information from the second signal. In other words, having already determined the unit of information from the first signal, step 240 may comprise determining the unit of information from the second signal by basing decisions of such a determination on the unit of information that has already been determined from the first signal. Such determination may also, for example, be based on an indication of reliability associated with the unit of information as communicated by the first signal.

The exemplary method 200 may, at step 250, perform continued processing. Such continued processing may comprise characteristics of any of a large variety of continued processing. For example and without limitation, step 250 may comprise returning to step 220 to receive and process more information. Also for example, step 250 may comprise performing additional processing to present received information to a user. Further for example, step 250 may comprise interfacing with a user to determine whether or how to process received information. Still further for example, step 250 may comprise transmitting information. Accordingly, the scope of various aspects of the present invention should not be limited by characteristics of any particular continued processing.

The two previous exemplary scenarios were presented to provide specific exemplary illustrations of generally broader aspects of the present invention. Accordingly, the scope of various aspects of the present invention should not be limited by characteristics of the specific exemplary illustrations presented above.

Figure 3:
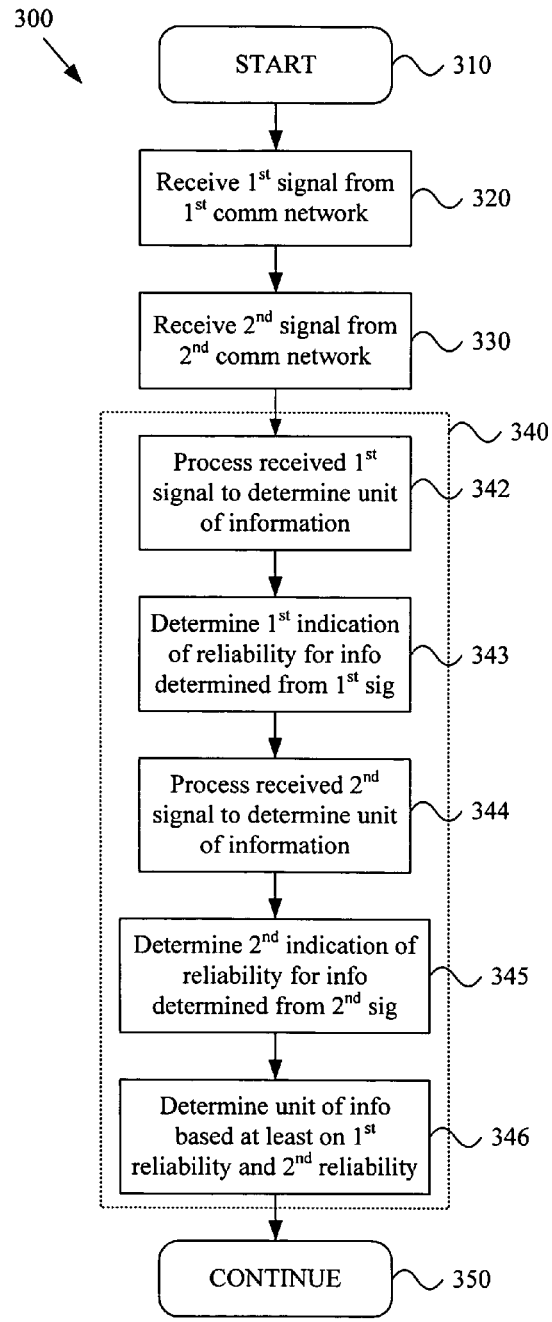
FIG. 3 shows a flow diagram of an exemplary method, in a communication system, for receiving information through multiple communication paths, in accordance with various aspects of the present invention.

FIG. 3 shows a flow diagram of an exemplary method 300, in a communication system, for receiving information through multiple communication paths, in accordance with various aspects of the present invention.

The exemplary method 300 may, at step 320, comprise receiving a first signal directly from a first communication network, where the first signal communicates information (e.g., a unit of information). Exemplary step 320 may, for example and without limitation, share various characteristics with step 220 of the exemplary method 200 illustrated in FIG. 2 and discussed previously.

The exemplary method 300 may, at step 330, comprise receiving a second signal directly from a second communication network (e.g., substantially different than the first communication network), where the second signal communicates information (e.g., the unit of information discussed previously with regard to the first signal). Exemplary step 330 may, for example and without limitation, share various characteristics with step 230 of the exemplary method 200 illustrated in FIG. 2 and discussed previously.

The exemplary method 300 may, at step 340, comprise processing the received first signal and the received second signal to determine the information (e.g., the unit of information communicated by the first and second signals received at steps 320 and 330). Exemplary step 340 may, for example and without limitation, share various characteristics with step 240 of the exemplary method 200 illustrated in FIG. 2 and discussed previously. The following discussion will present exemplary sub-steps for step 340. Note, however, that the scope of various aspects of the present invention should not be limited by characteristics of such exemplary sub-steps.

The exemplary method 300 may, at step 342, comprise processing the received first signal to determine the information (e.g., the unit of information). Such processing may comprise performing any of a large variety of signal processing operations to determine information from a received signal. For example and without limitation, step 342 may comprise performing signal demodulation, digital detection (for digital signals), signal decoding, decrypting, decompressing, error detecting and correcting, etc. The scope of various aspects of the present invention should not be limited by any particular manner of determining information from a signal.

The exemplary method 300 may, at step 343, comprise determining a first indication of reliability for the unit of information determined from the received first signal (e.g., a unit of information determined at step 342). An indication of reliability may generally be viewed as a signal or value (e.g., a numeric value, alpha-numeric value, etc.) associated with a degree of confidence that a unit of information determined from a signal is accurate or reliable. In a non-limiting exemplary scenario, a numeric scale may be utilized with high numbers associated with a relatively high degree of confidence and low numbers associated with a relatively low degree of confidence. In another non-limiting exemplary scenario, a numeric scale may correspond to a degree of statistical probability that a determined unit of information is accurate. The scope of various aspects of the present invention should not be limited by any particular indication of the reliability (or accuracy) of information.

Step 343 may comprise determining the first indication of reliability for the unit of information in any of a variety of manners. For example and without limitation, step 343 may determine the indication of reliability based, at least in part, on the frequency of detected and/or corrected errors. Also for example, step 343 may comprise determining the indication of reliability based, at least in part, on communication environmental conditions (e.g., S/N ratio). Further for example, step 343 may comprise determining the indication of reliability based, at least in part, on a predetermined confidence level (e.g., based on previous history with a particular information source or communication network from which the first signal was received). Accordingly, the scope of various aspects of the present invention should not be limited by characteristics of any particular manner of determining an indication of reliability or degree of confidence in received information.

The exemplary method 300 may, at step 344, comprise processing the received second signal to determine the unit of information. Exemplary step 344 may, for example and without limitation, share various characteristics with exemplary step 342 discussed previously, albeit with respect to the second signal received at step 330, instead of the first signal received at step 320.

The exemplary method 300 may, at step 345, may comprise determining a second indication of reliability for the information (e.g., the unit of information) determined at step 344. Exemplary step 345 may, for example and without limitation, share various characteristics with exemplary step 343 discussed previously, albeit with respect to the second signal received at step 330 and the information determined at step 344, instead of the first signal received at step 320 and the information determined at step 342.

The exemplary method 300 may, at step 346, comprise determining the unit of information based, at least in part, on the determined first and second indications of reliability. Step 346 may comprise determining the unit of information, based at least in part on the determined first and second indications of reliability, in any of a variety of manners. The following discussion will include various non-limiting exemplary illustrations, which should by no means, limit the scope of various aspects of the present invention.

In a first non-limiting exemplary scenario, step 346 may comprise selecting the most reliable unit of information. For example, step 346 may comprise determining, based at least in part on the respective indications of reliability determined at steps 343 and 345, that the information (e.g., a unit of information) communicated by the first signal received at step 320 and determined at step 342 is more reliable than the information (e.g., a unit of information) communicated by the second signal received at step 330 and determined at step 344. Step 346 may then, for example, select the unit of information determined at step 342.

In a second non-limiting exemplary scenario, step 346 may comprise determining the unit of information based, at least in part, on the unit of information determined (e.g., at step 342) from the received first signal, the first indication of reliability (e.g., determined at step 343), the unit of information determined (e.g., at step 344) from the received second signal, and the second indication of reliability (e.g., as determined at step 345). For example, step 346 may comprise determining the unit of information based, at least in part, on a weighted average. Such a weighted average may, for example, comprise weighting each unit of information (or portions thereof) by their respective indications of reliability.

In general, step 346 may comprise determining the unit of information based, at least in part, on the determined first and second indications of reliability. Accordingly, the scope of various aspects of the present invention should not be limited by characteristics of any particular manner of making such determination.

Exemplary method 300 was presented to provide specific exemplary illustrations of generally broader aspects of the present invention. Accordingly, the scope of various aspects of the present invention should not be limited by characteristics of the exemplary method 300.

Figure 4:
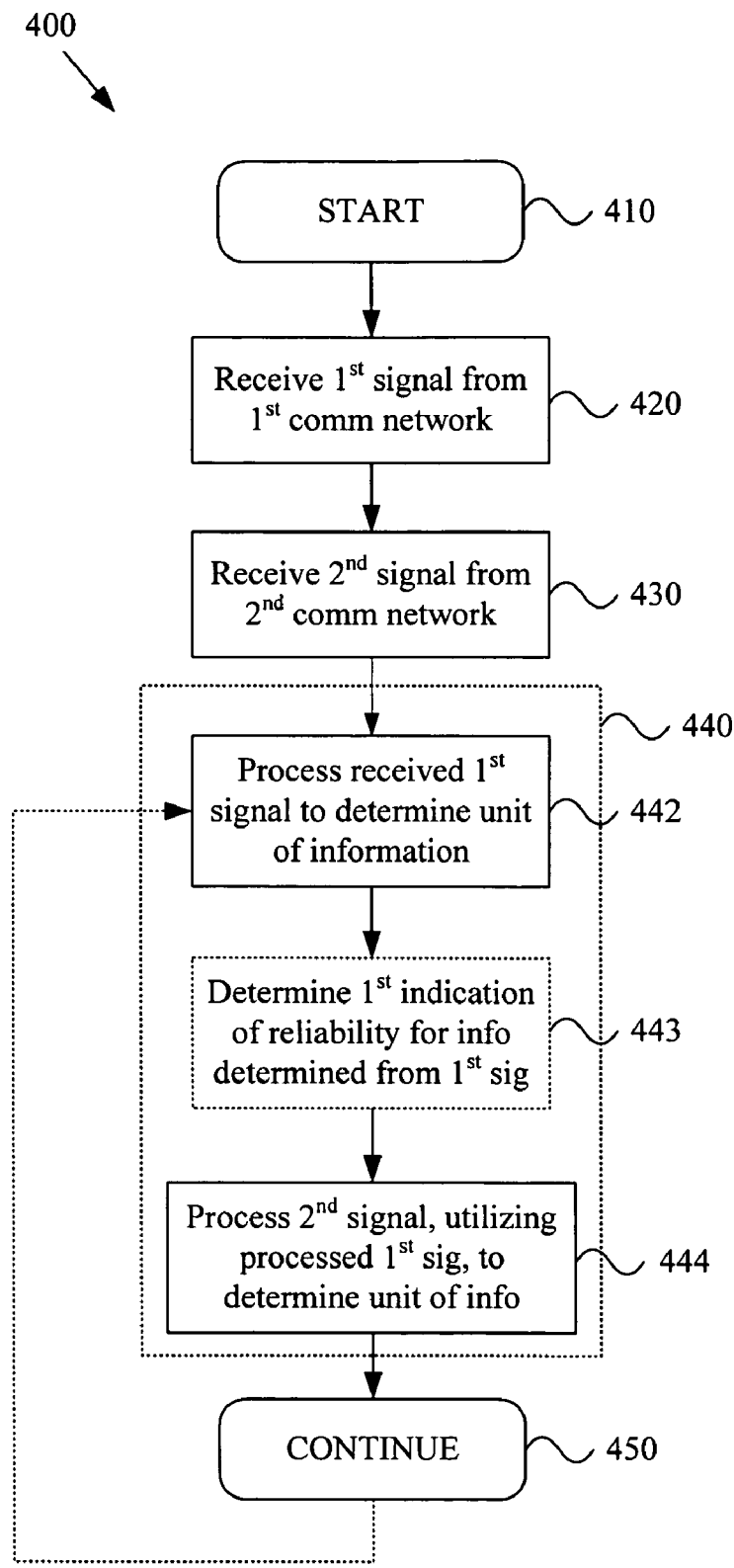
FIG. 4 shows a flow diagram of an exemplary method, in a communication system, for receiving information through multiple communication paths, in accordance with various aspects of the present invention.

FIG. 4 shows a flow diagram of an exemplary method 400, in a communication system, for receiving information through multiple communication paths, in accordance with various aspects of the present invention.

The exemplary method 400 may, at step 420, comprise receiving a first signal directly from a first communication network, where the first signal communicates information (e.g., a unit of information). Exemplary step 420 may, for example and without limitation, share various characteristics with steps 220 and 320 of the exemplary methods 200, 300 illustrated in FIGS. 2-3 and discussed previously.

The exemplary method 400 may, at step 430, comprise receiving a second signal directly from a second communication network (e.g., substantially different than the first communication network), where the second signal communicates information (e.g., the unit of information discussed previously with respect to the first signal). Exemplary step 430 may, for example and without limitation, share various characteristics with steps 230 and 330 of the exemplary methods 200, 300 illustrated in FIGS. 2-3 and discussed previously.

The exemplary method 400 may, at step 440, comprise processing the received first signal and the received second signal to determine the information (e.g., a unit of information communicated by the first and second signals received at steps 420 and 430). Exemplary step 440 may, for example and without limitation, share various characteristics with steps 240 and 340 of the exemplary methods 200, 300 illustrated in FIGS. 2-3 and discussed previously. The following discussion will present exemplary sub-steps for step 440. Note, however, that the scope of various aspects of the present invention should not be limited by characteristics of such exemplary sub-steps.

The exemplary method 400 may, at step 442, comprise processing the received first signal to determine the information (e.g., the unit of information). Exemplary step 442 may, for example and without limitation, share various characteristics with step 342 of the exemplary method 300 illustrated in FIG. 3 and discussed previously.

The exemplary method 400 may, at step 443, comprise determining a first indication of reliability for the unit of information determined from the received first signal (e.g., a unit of information determined at step 442). Exemplary step 443 may, for example and without limitation, share various characteristics with step 343 of the exemplary method 300 illustrated in FIG. 3 and discussed previously.

The exemplary method 400 may, at step 444, comprise processing the received second signal to determine the unit of information by utilizing the unit of information determined from the first signal (e.g., at step 442) to determine the unit of information from the second signal. Step 440 may comprise performing such processing in any of a variety of manners. The following discussion will include various non-limiting exemplary illustrations, characteristics of which should not limit the scope of various aspects of the present invention.

In a first exemplary scenario, step 444 may comprise utilizing the unit of information determined from the first signal as basis information, which may be modified in accordance with the unit of information determined from the second received signal. For example, if the unit of information (or a portion thereof) determined from the second received signal is different from a corresponding unit of information (or a portion thereof) determined from the first received signal, and the reliability of the unit of information determined from the second signal is relatively high, then step 444 may determine that the unit of information (or a portion thereof) determined from the second signal outweighs the unit of information determined from the first signal.

In a second exemplary scenario, step 444 may comprise utilizing the unit of information determined from the first signal as guide information, which may be utilized to adjust or influence the unit of information determined from the second received signal. For example, if the unit of information (or a portion thereof) determined from the second received signal is of relatively low reliability, then step 444 may modify such information in accordance with the unit of information determined from the first received signal (e.g., particularly when reliability of the unit of information determined from the first received signal is relatively high).

As mentioned previously, step 444 may, in various exemplary scenarios comprise utilizing respective indications of reliability for the units of information determined from the first and second signals. Note, however, that step 444 does not necessarily utilize such indications of reliability. For example and without limitation, step 444 may comprise utilizing a predetermined algorithm for determining the unit of information from the second signal, based at least in part on the unit of information determined from the first signal, where such predetermined algorithm does not explicitly utilize a determination of information reliability.

The exemplary method 400 may, at step 450, comprise performing continued processing. Step 450 may generally comprise performing any of a variety of continued processing (e.g., as discussed previously with regard to step 250 of the exemplary method 200 illustrated at FIG. 2).

Step 450 may, for example, return execution flow of the exemplary method 400 to step 420 for receiving and processing additional signals and information. Step 450 may also, for example, utilize the unit of information determined from the second signal at step 444 to further refine the unit of information determined from the first signal (e.g., utilizing an iterative processing approach). For example, step 450 may comprise determining a second indication of reliability for the unit of information determined from the second signal (e.g., at step 444). Step 442 may then, in the exemplary scenario, comprise utilizing the determined unit of information as determined from the second signal and the determined second indication of reliability to refine or redetermine the unit of information from the first signal.

In general, step 444 may comprise processing the received second signal to determine the unit of information by utilizing the unit of information determined from the first signal to determine the unit of information from the second signal. Accordingly, the scope of various aspects of the present invention should not be limited by characteristics of any particular manner of making such determination.

Exemplary method 400 was presented to provide specific exemplary illustrations of generally broader aspects of the present invention. Accordingly, the scope of various aspects of the present invention should not be limited by characteristics of the exemplary method 400.

Figure 5:
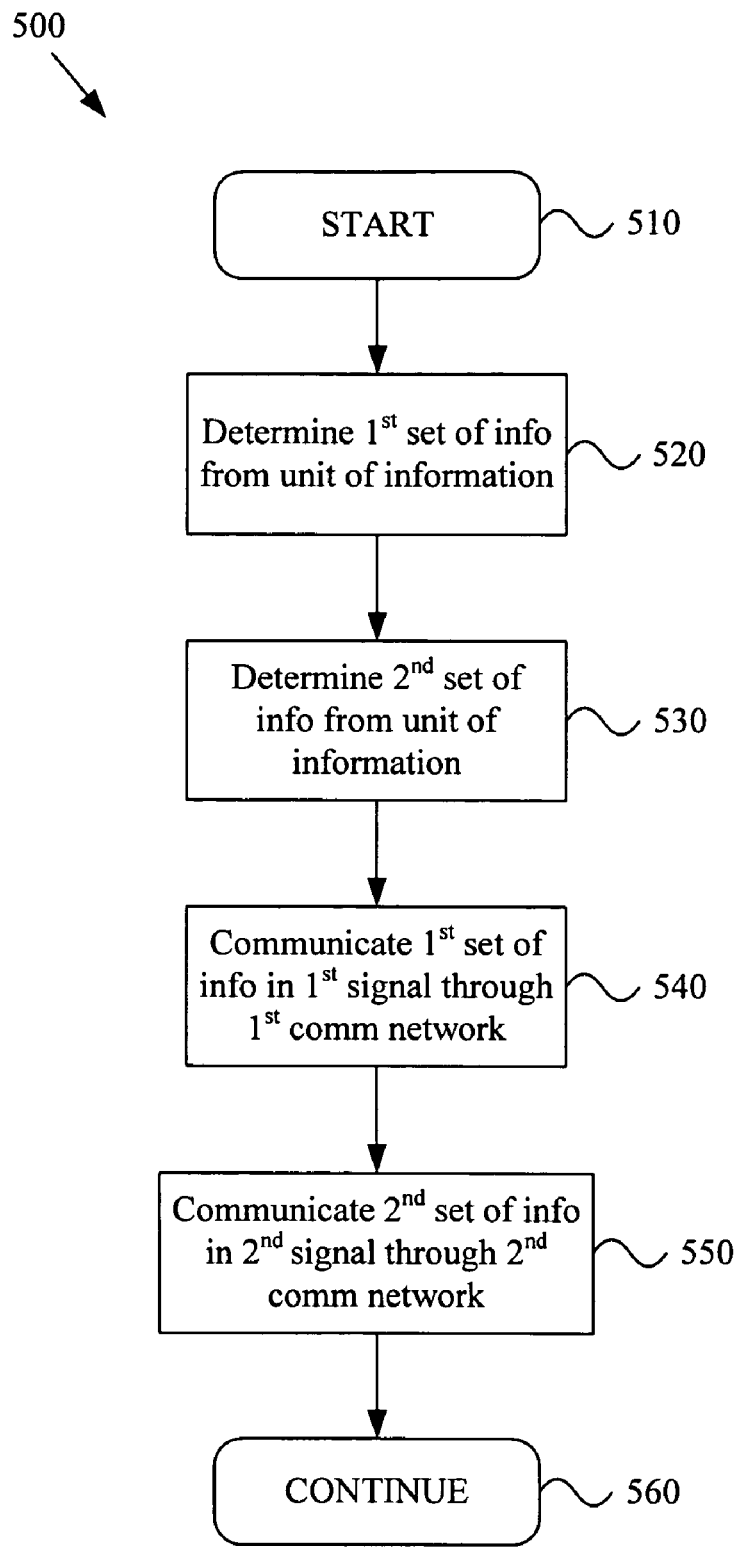
FIG. 5 shows a flow diagram of an exemplary method, in a communication system, for utilizing multiple communication paths for communicating information, in accordance with various aspects of the present invention.

FIG. 5 shows a flow diagram of an exemplary method 500, in a communication system, for utilizing multiple communication paths for communicating information (e.g., a unit of information), in accordance with various aspects of the present invention. The exemplary method 500 may be implemented in any of a variety of communication systems. For example and without limitation, a communication system may comprise characteristics of a cellular phone, paging device, portable multi-media communication device, pocket computer, personal digital assistant, portable telephone, desktop or portable computer, etc. Accordingly, the scope of various aspects of the present invention should not be limited by characteristics of a particular communication system.

The information may, for example, comprise one or more units of information. As explained previously, a "unit of information" is generally a quantifiable amount of information. For example and without limitation, a unit of information may be a packet, bit, symbol, data frame, message, song, program, music video, movie, timed segment of a communication, etc. Such information may comprise characteristics of any of a variety of types of information (e.g., textual, graphical, multi-media, video, audio, pictorial, general data, etc.). The scope of various aspects of the present invention should not be limited by characteristics of a particular type of information or by any arbitrary notion of what a unit of such information may comprise.

The exemplary method 500 may, at step 520, comprise determining a first set of information representative of the unit of information. The first set of information may be representative of the unit of information in any of a variety of ways. For example and without limitation, the first set of information may correspond exactly to the unit of information. Also for example, the first set of information may comprise a compressed, encoded or encrypted version of the unit of information. Accordingly, the scope of various aspects of the present invention should not be limited by any particular manner in which a set of information may represent a unit of information.

Step 520 may comprise determining the first set of information in any of a variety of manners. For example and without limitation, step 520 may comprise compressing data representative of the unit of information. Such compression may, for example, be performed in any of a variety of manners and/or in accordance with any of a variety of compression standards. Also for example, step 520 may comprise encoding or encrypting information representative of the unit of information. The scope of various aspects of the present invention should not be limited by characteristics of any particular manner of determining a set of information that is representative of a particular unit of information.

The exemplary method 500 may, at step 530, comprise determining a second set of information representative of the unit of information. Step 530 may, for example and without limitation, share various characteristics with exemplary step 520. For example, the second set of information may be identical to the first set of information.

Also for example, the second set of information may be different than the first set of information. For example and without limitation, the second set of information might comprise a compressed representation of the unit of information, while the first set of information might comprise an exact representation of the unit of information or a different compressed representation than the second set of information. Also for example, the second and first sets of information may be encoded or encrypted differently. Further for example, the second and first sets of information may represent the unit of information at different respective resolution levels (e.g., data point, spatial and/or temporal resolution levels).

Note that the first and second sets of information may comprise or be communicated with any of a variety of additional information (e.g., information not directly representative of the unit of information). For example and without limitation, such additional information may comprise information identifying the unit of information (or portion thereof) that is represented. For example, such additional information may also comprise timestamp or sequence information. In a non-limiting exemplary scenario, the first and second sets of information may be sub-divided into one or more data frames or packets, each of which comprises header information. Continuing the non-limiting exemplary scenario, respective headers of the first and second sets of information may comprise information that may be utilized to synchronize or correlate the first and second sets of information. For example, the first and second sets of information may comprise at least some common header information. Continuing the non-limiting exemplary scenario, respective headers of the first and second sets of information may comprise common source and/or destination information.

In general, the first and second sets of information may comprise or be communicated with any of a variety of additional information. Accordingly, the scope of various aspects of the present invention should not be limited by characteristics of any particular type of additional information.

In general step 530 may comprise determining a second set of information representative of the unit of information. Accordingly, the scope of various aspects of the present invention should not be limited by characteristics of a particular manner in which a unit of information may be represented or by any particular manner of determining a set of information that is representative of a particular unit of information.

The exemplary method 500 may, at step 540, comprise communicating the first set of information in a first signal communicated directly to (and through) a first communication network. The first communication network may, for example, be communicatively coupled to one or more other communication systems to which the first signal may be communicated. Various characteristics of signals and networks were discussed previously with regard to the discussion of FIG. 2.

Referring briefly to the exemplary communication environment 100 illustrated in FIG. 1, the first communication system 110 may communicate a first signal to the wireless carrier central office 120 (or another system communicatively coupled thereto) through wireless interface 130 of the wireless carrier's communication infrastructure, where the first signal communicates a first set of information representative of a unit of information (e.g., a segment of a telephone call). Also for example, the second communication system 150 may communicate a first signal to the wireless carrier central office 120 through local wireless interface 170 of a personal area network, where the first signal communicates a first set of information representative of a unit of information (e.g., a song). Further for example, the third communication system 180 may communicate a first signal to the wireless carrier central office through a wireless access point 193 of the CDMA network 195, where the first signal communicates a first set of information representative of a unit of information (e.g., a video image). Still further for example, the wireless carrier central office 120 may communicate a first signal to the first communication system 110 through wireless interface 130, where the first signal communicates a first set of information representative of a unit of information (e.g., a text message).

As discussed previously, in general, the first signal may comprise characteristics of any of a variety of communication signal types, and the first communication network may comprise characteristics of any of a variety of communication network types. Accordingly, the scope of various aspects of the present invention should not be limited by characteristics of any particular signal type or type of communication network.

Step 540 may, for example, comprise transmitting the first signal utilizing a transmitter (or transceiver). Such a transmitter may comprise characteristics of any of a variety of transmitter types. For example and without limitation, the transmitter may comprise characteristics of a wired, wireless or optical transmitter. Also for example, the transmitter may be adapted to communicate information communicated utilizing any of a variety of communication protocols or standards. The transmitter may, for example, be associated with an antenna (or other signal port) coupled to the transmitter. The scope of various aspects of the present invention should not be limited by characteristics of any particular type of transmitter or other apparatus that may transmit a signal that communicates information.

The exemplary method 500 may, at step 550, comprise communicating the second set of information (e.g., as determined at step 530) in a second signal communicated directly to (and through) a second communication network (e.g., substantially different from the first communication network). The second communication network may, for example, be communicatively coupled to one or more other communication systems to which the second signal may be communicated. Non-limiting exemplary characteristics of various signal and communication network types were presented previously. Consider the following non-limiting illustrative examples.

Referring briefly to the exemplary communication environment 100 illustrated in FIG. 1, the first communication system 110 may communicate a second signal to the wireless carrier central office 120 through the local wireless interface 140 of, for example, an office LAN, where the second signal communicates the second set of information representative of the unit of information (e.g., a segment of a telephone call). Also for example, the second communication system 150 may communicate a second signal to the wireless carrier central office 120 through the wireless interface 160 of the wireless carrier's communication infrastructure, where the second signal communicates the second set of information representative of the unit of information (e.g., a song).

Further for example, the third communication system 180 may communicate a second signal to the wireless carrier central office 120 through a wireless access point 190 of the wireless carrier's communication infrastructure, where the second signal communicates the second set of information representative of the unit of information (e.g., a video image). Still further for example, the wireless carrier central office 120 may communicate a second signal to the first communication system 110 through the broadband access network 143, local gateway 141 and local wireless interface 140, where the second signal communicates the second set of information representative of the unit of information (e.g., a text message).

Generally, step 550 may comprise communicating the second set of information (e.g., as determined at step 530) in a second signal communicated directly to (and through) a second communication network. Accordingly, the scope of various aspects of the present invention should not be limited by characteristics of any particular type of signal or type of communication network.

Step 550 may, for example, comprise transmitting the second signal utilizing a transmitter (or transceiver). Such a transmitter may comprise characteristics of any of a variety of transmitter types. For example and without limitation, the transmitter may comprise characteristics of a wired, wireless or optical transmitter. Also for example, the transmitter may be adapted to communicate information communicated utilizing any of a variety of communication protocols or standards. The transmitter may, for example, be independent of a transmitter utilized to transmitter the first signal at step 540. Alternatively, for example, the transmitter may share one or more components with a transmitter utilized to receive the first signal at step 540. The transmitter may, for example, be associated with an antenna (or other signal port) coupled to the transmitter. The scope of various aspects of the present invention should not be limited by characteristics of any particular type of transmitter or other apparatus that may transmit a signal that communicates information.

The exemplary method 500 illustrated in FIG. 5 and discussed above was presented to provide specific examples of generally broader aspects of the present invention. Accordingly, the scope of various aspects of the present invention should not be limited by specific characteristics of the exemplary illustration.

Figure 6:
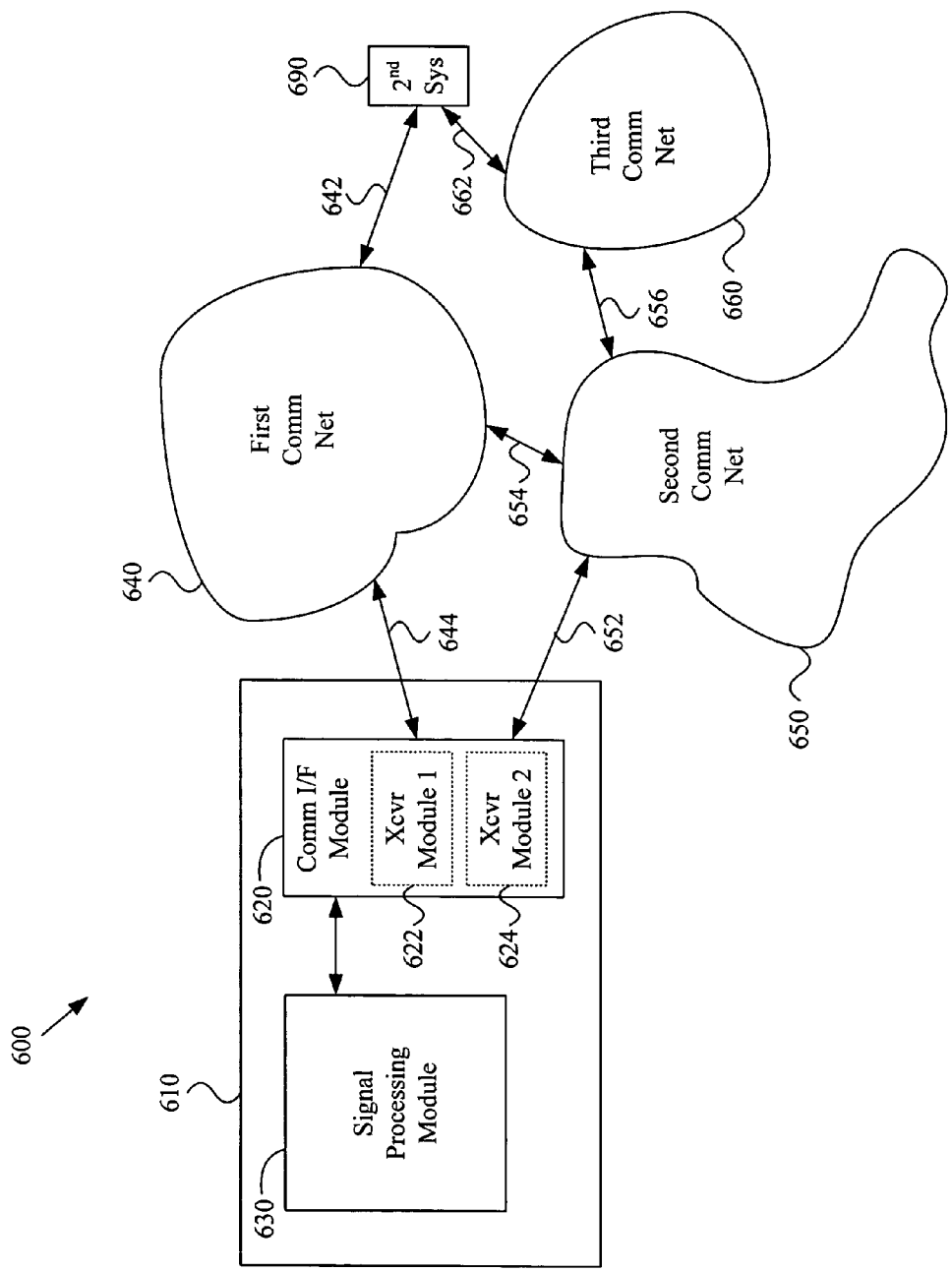
FIG. 6 is a drawing showing a block diagram of an exemplary multiple network communication environment comprising a communication system that communicates information through multiple communication paths, in accordance with various aspects of the present invention.

FIG. 6 is a drawing showing a block diagram of an exemplary communication environment 600 comprising a communication system 610 for communicating (i.e., receiving and/or transmitting) information, in accordance with various aspects of the present invention. Various components of the exemplary communication system 610 may, for example and without limitation, share various functional characteristics with the exemplary methods 200-500 illustrated in FIGS. 2-5 and discussed previously.

Additionally, the exemplary communication environment 600 may share various characteristics with the exemplary communication environment 100 illustrated in FIG. 1 and discussed previously. Note that the exemplary communication environment 600 shows a relatively small set of communication systems and communication system components. The relatively small set was selected for the purpose of illustrative clarity and should by no means limit the scope of various aspects of the present invention.

The exemplary communication environment 600 comprises a communication system 610, which comprises a communication interface module 620 and a signal processing module 630. The communication system 610 is communicatively coupled to the second system 690 through a plurality of communication paths. The second system 690 may, for example and without limitation, communicate any of a variety of information with the communication system 610.

The following discussion will refer to various functional modules of the communication system 610. It should be noted that various functional modules might be implemented in hardware, software or a combination thereof. Also, various modules may be independent or may share various portions or sub-modules. For example, a first module may share various hardware and/or software components with a second module. Accordingly, the scope of various aspects of the present invention should not be limited by any particular module implementation or by arbitrary boundaries between modules.

A first exemplary communication path between the communication system 610 and the second system 690 flows through communication link 644, the first communication network 640 and communication link 642. The second exemplary communication path between the communication system 610 and the second system 690 flows through communication link 652, the second communication network 650, communication link 654, the first communication network 640 and communication link 642. Notice that the second exemplary communication path comprises a portion of the first communication path (e.g., at least a portion of the first communication network 640 and communication link 642).

The third exemplary communication path between the communication system 610 and the second system 690 flows through communication link 652, the second communication network 650, communication link 656, the third communication network 660 and communication link 662. For illustrative purposes, the third communication network 660 will occasionally be referred to as the Internet 660. Note, however, that such an illustrative example should in no way limit the scope of various aspects of the present invention. Notice that the third communication path comprises a portion of the second communication path (e.g., communication link 652 and at least a portion of the second communication network 650), but is completely independent of the first communication path. This serves to illustrate that various communication paths may be independent from, or dependent on, other communication paths or communication network components thereof.

The first, second and third exemplary communication paths, and their respective communication networks, will be utilized to provide specific examples of various broader aspects of the present invention. As discussed previously, various communication paths may comprise any of a variety of communication path characteristics, and the communication networks may comprise any of a variety of communication network characteristics. Accordingly, the scope of various aspects of the present invention should not be limited by characteristics of any particular communication path, by characteristics of one or more communication networks that a communication path may include, or by any particular number of communication paths or networks.

The communication system 610 may comprise characteristics of any of a variety of communication systems (e.g., portable or handheld communication systems). For example and without limitation, the communication system 610 may comprise characteristics of a cellular phone, paging device, portable multi-media communication device, pocket computer, personal digital assistant, portable telephone, desktop or portable computer, etc. Accordingly, the scope of various aspects of the present invention should not be limited by characteristics of a particular communication system.

Note that many of the following exemplary illustrations utilize two-signal scenarios to illustrate various aspects of the present invention. It should be recognized that two-signal scenarios were chosen for the sake of illustrative clarity. Accordingly, the scope of various aspects of the present invention should not be limited by characteristics of various two-signal scenarios. For example, the various two-signal illustrations may be readily extended to three-signal or n-signal scenarios.

The communication system 610 may comprise a communication interface module 620 and a signal processing module 630. The communication interface module 620 may, in turn, comprise a first transceiver module 622 and a second transceiver module 624. Note that the following discussion may utilize the terms "transceiver," "receiver," and "transmitter." Such terms may often be used interchangeably, and accordingly, the scope of various aspects of the present invention should not be limited by a specific utilization of such terms. Further, the following discussion will refer to respective signals communicated by the respective transceivers. It should be noted that in various scenarios, a plurality of signals may be communicated by a single transceiver.

The first transceiver module 622 may, for example, receive a first signal directly from the first communication network 640 (e.g., over communication link 644), where the first signal communicates information. Such information may, for example, comprise one or more units of information, where a "unit of information" is generally a quantifiable amount of information. For example and without limitation, a unit of information may be a packet, bit, symbol, data frame, message, song, program, music video, movie, timed segment of a communication, etc. Such information may comprise characteristics of any of a variety of types of information (e.g., textual, graphical, multi-media, video, audio, pictorial, general data, etc.). The scope of various aspects of the present invention should not be limited by characteristics of a particular type of information or by any arbitrary notion of what a unit of such information may comprise.

The first communication network 640 may comprise characteristics of any of a variety of communication network types. For example and without limitation, the first communication network 640 may comprise a telecommunication network, television network or a computer network. The first communication network 640 may, for example, comprise a relatively small area network, for example, a personal area network ("PAN") or local area network ("LAN"). Also, the first communication network 640 may, for example, comprise a relatively large area network, for example, a metropolitan area network ("MAN"), national communication network or worldwide communication network (e.g., the Internet or various satellite communication networks). The first communication network 640 may be a portion of (or all of) a first communication path between communicating systems. For example, as discussed previously, a communication path may comprise one or more communicatively coupled communication networks. Accordingly, the scope of various aspects of the present invention should not be limited by characteristics of a particular communication network type.

The first signal may comprise characteristics of any of a variety of communication signal types. For example and without limitation, the first signal may be communicated over any of a variety of communication media (e.g., wired, wireless, tethered optical, non-tethered optical, etc.). Also for example, the first signal may communicate information (e.g., a unit of information) using any of a large variety of encoding strategies, modulation techniques, compression techniques, communication protocols, etc. In a non-limiting exemplary scenario, the first signal may comprise a wireless signal communicated utilizing the IEEE 802.11 communication standard that communicates video information compressed in accordance with MPEG-4, part 10, which is encrypted utilizing public/private key encryption. In another non-limiting exemplary scenario, the first signal may comprise a wireless signal communicated utilizing the GSM communication standard that communicates cellular telephone information.

In general, the first signal may comprise characteristics of any of a variety of communication signal types. Accordingly, the scope of various aspects of the present invention should not be limited by characteristics of any particular communication signal type.

The first transceiver module 622 may comprise characteristics of any of a variety of transceiver (or receiver or transmitter) types. For example and without limitation, the first transceiver module 622 may comprise characteristics of a wired, wireless or optical transceiver. Also for example, the first transceiver module 622 may be adapted to communicate information utilizing any of a variety of communication protocols or standards. The first transceiver module 622 may, for example, be associated with an antenna (or other signal port) coupled to the first transceiver module 622. The scope of various aspects of the present invention should not be limited by characteristics of any particular type of transceiver, receiver or other apparatus that may receive a signal that communicates information.

The second transceiver module 624 may, for example, receive a second signal directly from the second communication network 650, which may be substantially different than the first communication network 640, where the second signal communicates information (e.g., the unit of information discussed previously with regard to the first signal). For example, the second signal may generally communicate the same unit of information that the first signal (e.g., received by the first transceiver module 622) communicates. Note, however, that communicating a same unit of information does not necessarily comprise communicating the same data. For example and without limitation, a unit of information may be communicated with a variety of data resolutions (e.g., spatial, color, intensity and/or temporal resolutions). Also for example, a unit of information may be communicated utilizing a variety of data compression techniques and/or encoding strategies.

As discussed above, the first and second signals may each communicate at least a portion of the same unit of information. Note that the first and second signals may also communicate information that identifies the unit of information (or portion thereof) that is communicated. For example and without limitation, each of the first and second signals may communicate data packets or frames comprising header information that identifies the particular unit of information being communicated. Such identification information may, for example and without limitation, comprise timestamp information, sequence information, data identification information, etc. In a non-limiting exemplary scenario, the first signal may communicate a unit of information along with header information identifying the unit of information, and the second signal may communicate the same unit of information along with at least a portion of the same header information identifying the unit of information.

As with the first communication network 640, the second communication network 650 may comprise characteristics of any of a variety of communication network types. As illustrated in the exemplary communication environment 600, the second communication network 650 may be a portion of, or all of, a communication path between communicating systems (e.g., the communication system 610 and the second system 690). Note that the second communication path may share one or more communication networks (or portions thereof) with other communication paths. For example, the second communication network 650 may be communicatively coupled through communication link 654 (directly or indirectly) with the first communication network 640 discussed previously.

Generally, the second communication network may comprise characteristics of any of a variety of communication network types. Accordingly, the scope of various aspects of the present invention should not be limited by characteristics of a particular communication network type.

As with the first signal, discussed previously with regard to the first transceiver module 622, the second signal may comprise characteristics of any of a variety of communication signal types. For example and without limitation, the second signal may be communicated over any of a variety of communication media (e.g., wired, wireless, tethered optical, non-tethered optical, etc.). Also for example, the second signal may communicate information (e.g., a unit of information) using any of a large variety of encoding strategies, modulation techniques, compression techniques, communication protocols, etc. In a non-limiting exemplary scenario, the second signal may comprise a wireless signal communicated utilizing the IEEE 802.11 communication standard that communicates video information compressed in accordance with MPEG-4, part 10, which is encrypted utilizing public/private key encryption. In another non-limiting exemplary scenario, the second signal may comprise a wireless signal communicated utilizing the GSM communication standard that communicates cellular telephone information.

In general, the second signal may comprise characteristics of any of a variety of communication signal types. Accordingly, the scope of various aspects of the present invention should not be limited by characteristics of any particular communication signal type.

The signal processing module 630 may process the first signal (e.g., received by the first transceiver module 622) and the second signal (e.g., received by the second transceiver module 624) to determine the information (e.g., the unit of information) communicated by the first and second signals. The signal processing module 630 may process the received first and second signals in any of a variety of manners, non-limiting examples of which are presented below.

In a first non-limiting exemplary scenario, the signal processing module 630 may process the first signal (e.g., as received by the first transceiver module 622) to determine the unit of information, and determine a first indication of reliability for the unit of information determined from the first signal. The signal processing module 630 may then process the second signal (e.g., as received by the second transceiver module 624) to determine the unit of information, and determine a second indication of reliability for the unit of information determined from the second signal. The signal processing module 630 may then determine the unit of information based, at least in part, on the determined first and second indications of reliability.

Continuing the exemplary scenario, the signal processing module 630 may, for example, determine the unit of information by selecting, either the unit of information determined from the first signal or the unit of information determined from the second signal, based at least in part on the respective indications of reliability. Alternatively, for example, the signal processing module 630 may determine the unit of information by combining the unit of information determined from the first signal and the unit of information determined from the second signal. Such combining may, for example and without limitation, be based at least in part on a weighting technique related to the respective indications of reliability.

In a second non-limiting exemplary scenario, the signal processing module 630 may process the first signal (e.g., as received by the first transceiver module 622) to determine the unit of information as communicated by the first signal. The signal processing module 630 may then process the second signal (e.g., as received by the second transceiver module 624) to determine the unit of information by utilizing the unit of information determined from the first signal to determine the unit of information from the second signal. In other words, having already determined the unit of information from the first signal, the signal processing module 630 may determine the unit of information from the second signal by basing decisions of such a determination on the unit of information that has already been determined from the first signal. Such determination may also, for example, be based on an indication of reliability associated with the unit of information as communicated by the first signal.

The two previous exemplary scenarios were presented to provide specific exemplary illustrations of generally broader aspects of the present invention. Accordingly, the scope of various aspects of the present invention should not be limited by characteristics of the specific exemplary illustrations presented above.

Figure 7:
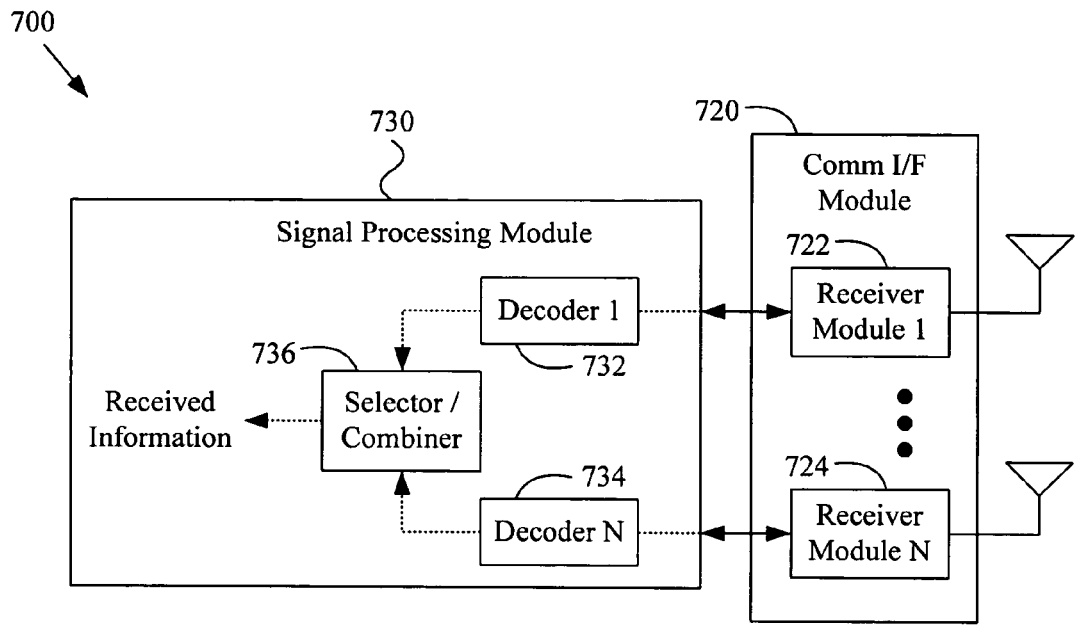
FIG. 7 is a diagram illustrating an exemplary communication system that receives information through multiple communication paths, in accordance with various aspects of the present invention.

FIG. 7 is a diagram illustrating an exemplary communication system 700 that receives information through multiple communication paths, in accordance with various aspects of the present invention. Various components of the exemplary communication system 700 may, for example and without limitation, share various functional characteristics with the exemplary methods 200-400 illustrated in FIGS. 2-4 and discussed previously. Also without limitation, components of the exemplary communication system 700 may also share various characteristics with components of the exemplary communication system 610 illustrated in FIG. 6 and discussed previously.

The exemplary communication system 700 may comprise a communication interface module 720 and a signal processing module 730. The communication interface module 720 may comprise a first receiver module 722 and a second (or Nth) receiver module 724. The signal processing module 730 may comprise a first decoder 732 and a second (or Nth) decoder 734. The signal processing module 730 may also comprise a selector/combiner module 736.

The communication interface module 720 may, for example and without limitation, share various characteristics with the communication interface module 620 illustrated in FIG. 6 and discussed previously. Also for example, the communication interface module 720 may share various functional characteristics with steps 220-230, 320-330 and 420-430 of exemplary methods 200-400 illustrated in FIGS. 2-4 and discussed previously.

Figure 8:
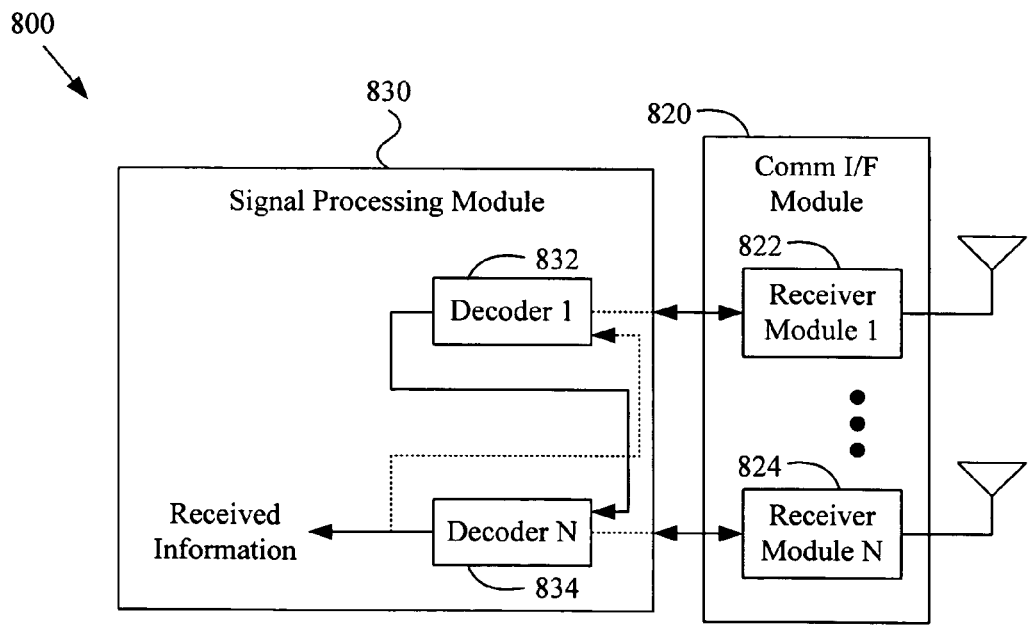
FIG. 8 is a diagram illustrating an exemplary communication system that receives information through multiple communication paths, in accordance with various aspects of the present invention.
Figure 9:
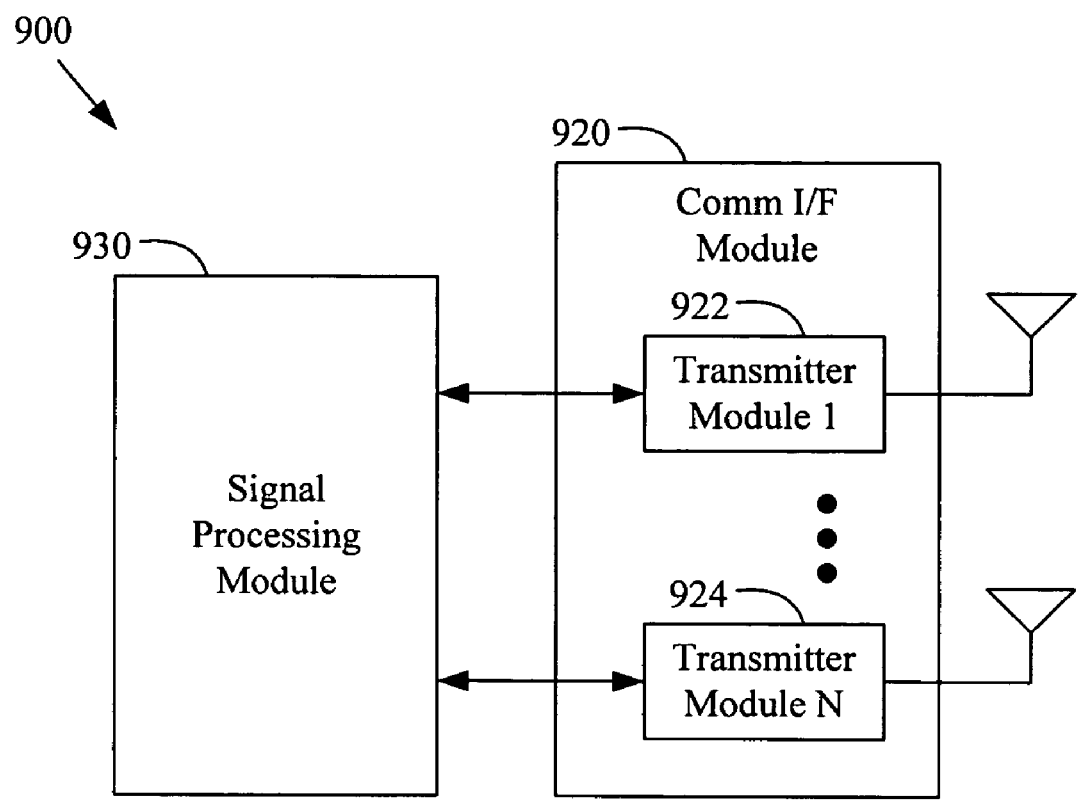
FIG. 9 is a diagram illustrating an exemplary communication system that communicates information through multiple communication paths, in accordance with various aspects of the present invention.

The exemplary communication system 700, and the exemplary communication systems 800, 900 shown in FIGS. 8-9, are illustrated with antennas coupled to transmitters and/or receivers. It should be noted that the antennas are merely illustrative and accordingly, the scope of various aspects of the present invention should not be limited by characteristics of RF wireless communication systems.

The first receiver module 722 may receive a first signal directly from a first communication network, where the first signal communicates information (e.g., a unit of information). The first receiver module 722 may, for example and without limitation, share various functional characteristics with steps 220, 320 and 420 of the exemplary methods 200-400 illustrated in FIGS. 2-4 and discussed previously. The first receiver module 722 may also, for example, share various characteristics with the first transceiver module 622 illustrated in FIG. 6 and discussed previously.

The second receiver module 724 may receive a second signal directly from a second communication network (e.g., substantially different than the first communication network), where the second signal communicates information (e.g., the unit of information discussed previously with respect to the first signal). The second receiver module 724 may, for example and without limitation, share various functional characteristics with steps 230, 330 and 430 of the exemplary methods 200-400 illustrated in FIGS. 2-4 and discussed previously. The second receiver module 724 may also, for example, share various characteristics with the second transceiver module 624 illustrated in FIG. 6 and discussed previously.

The signal processing module 730 may, for example, process the first signal (e.g., as received by the first receiver module 722) and the second signal (e.g., as received by the second receiver module 724) to determine the information (e.g., a unit of information communicated by the first and second signals). The signal processing module 730 may, for example and without limitation, share various characteristics with steps 240 and 340 of the exemplary methods 200, 300 illustrated in FIGS. 2-3 and discussed previously. The following discussion will present exemplary processing scenarios for the signal processing module 730. Note, however, that the scope of various aspects of the present invention should not be limited by characteristics of such exemplary processing scenarios.

The signal processing module 730 may, for example, process the received first signal to determine the information communicated by the first signal (e.g., the unit of information). Such processing may comprise performing any of a large variety of signal processing operations to determine information from a received signal. For example and without limitation, the signal processing module 730 may utilize a first decoder 732 to decode the received first signal. Also, the signal processing module 730 may perform other or additional processing tasks, for example, signal demodulation, digital detection (for digital signals), signal decoding, decrypting, decompressing, error detecting and correcting, etc. The scope of various aspects of the present invention should not be limited by characteristics of any particular manner of determining information from a signal or by characteristics of related apparatus.

The signal processing module 730 may, for example, determine a first indication of reliability for the unit of information determined from the received first signal. As explained previously, an indication of reliability may generally be viewed as a signal or value (e.g., a numeric value, alpha-numeric value, etc.) associated with a degree of confidence that a unit of information determined from a signal is accurate or reliable. In a non-limiting exemplary scenario, a numeric scale may be utilized with high numbers associated with a relatively high degree of confidence and low numbers associated with a relatively low degree of confidence. In another non-limiting exemplary scenario, a numeric scale may correspond to a degree of statistical probability that a determined unit of information is accurate. The scope of various aspects of the present invention should not be limited by any particular indication of the reliability (or accuracy) of information.

The signal processing module 730 may determine the first indication of reliability for the unit of information in any of a variety of manners. For example and without limitation, the signal processing module 730 may determine the indication of reliability based, at least in part, on the frequency of detected and/or corrected errors. Also for example, the signal processing module 730 may determine the indication of reliability based, at least in part, on communication environmental conditions (e.g., S/N ratio). Further for example, the signal processing module 730 may determine the indication of reliability based, at least in part, on a predetermined confidence level (e.g., based on previous history with a particular information source or communication network from which the first signal was received). Accordingly, the scope of various aspects of the present invention should not be limited by characteristics of any particular manner of (or apparatus for) determining an indication of reliability or degree of confidence in received information.

The signal processing module 730 may, for example, process the received second signal to determine the unit of information. The signal processing module 730 may, for example and without limitation, share various functional characteristics with exemplary step 344 of the exemplary method 300 illustrated in FIG. 3 and discussed previously.

The signal processing module 730 may, for example, determine a second indication of reliability for the information (e.g., the unit of information) determined from the second signal. The signal processing module 730 may, for example and without limitation, share various functional characteristics with exemplary step 345 of the exemplary method 300 illustrated in FIG. 3 and discussed previously.

The signal processing module 730 may, for example, determine the unit of information based, at least in part, on the determined first and second indications of reliability. The signal processing module 730 may, for example and without limitation, share various functional characteristics with exemplary step 346 of the exemplary method 300 illustrated in FIG. 3 and discussed previously. For example, the signal processing module 730 may determine the unit of information, based at least in part on the determined first and second indications of reliability, in any of a variety of manners. The following discussion will include various non-limiting exemplary illustrations, which should by no means, limit the scope of various aspects of the present invention.

In a first non-limiting exemplary scenario, the signal processing module 730 (e.g., using the selector/combiner module 736) may select the most reliable unit of information. For example, the selector/combiner module 736 may determine, based at least in part on the respective indications of reliability determined previously, that the information (e.g., a unit of information) determined from the received first signal is more reliable than the information (e.g., a unit of information) determined from the received second signal. The selector/combiner module 736 may then, for example, select the unit of information determined from the received first signal.

In a second non-limiting exemplary scenario, the signal processing module 730 (e.g., using the selector/combiner module 736) may determine the unit of information based, at least in part, on the unit of information determined from the received first signal, the first indication of reliability, the unit of information determined from the received second signal, and the second indication of reliability. For example, the selector/combiner module 736 may determine the unit of information based, at least in part, on a weighted average. Such a weighted average may, for example, comprise weighting each unit of information (or portions thereof) by their respective indications of reliability.

In general, the signal processing module 730 may determine the unit of information based, at least in part, on the determined first and second indications of reliability. Accordingly, the scope of various aspects of the present invention should not be limited by characteristics of any particular manner of making such determination.

Exemplary communication system 700 was presented to provide specific exemplary illustrations of generally broader aspects of the present invention. Accordingly, the scope of various aspects of the present invention should not be limited by characteristics of the exemplary communication system 700.

FIG. 8 is a diagram illustrating an exemplary communication system 800 that receives information through multiple communication paths, in accordance with various aspects of the present invention. The communication system 800 may, for example and without limitation, share various characteristics with the exemplary communication systems 610, 700 illustrated in FIGS. 6-7 and discussed previously. Also for example, components of the communication system 800 may share various functional characteristics with the exemplary methods 200, 400 illustrated in FIGS. 2 and 4 and discussed previously.

The exemplary communication system 800 may comprise a communication interface module 820 and a signal processing module 830. The communication interface module 820 may comprise a first receiver module 822 and a second (or Nth) receiver module 824. The signal processing module 830 may comprise a first decoder 832 and a second (or Nth) decoder 834.

The communication interface module 820 may, for example and without limitation, share various characteristics with the communication interface modules 620, 720 illustrated in FIGS. 6-7 and discussed previously. Also for example, the communication interface module 820 may share various functional characteristics with steps 220-230 and 420-430 of exemplary methods 200, 400 illustrated in FIGS. 2 and 4 and discussed previously.

The signal processing module 830 may, for example, process the first signal (e.g., as received by the first receiver module 822) and the second signal (e.g., as received by the second receiver module 824) to determine the information (e.g., a unit of information communicated by the first and second signals). The signal processing module 830 may, for example and without limitation, share various characteristics with steps 240 and 440 of the exemplary methods 200, 400 illustrated in FIGS. 2 and 4 and discussed previously. The following discussion will present exemplary processing scenarios for the signal processing module 830. Note, however, that the scope of various aspects of the present invention should not be limited by characteristics of such exemplary processing scenarios.

The signal processing module 830 may, for example, process the received first signal to determine the information communicated by the first signal (e.g., the unit of information). The signal processing module 830 may, for example and without limitation, share various functional characteristics with step 442 of the exemplary method 400 illustrated in FIG. 4 and discussed previously. Such processing may comprise performing any of a large variety of signal processing operations to determine information from a received signal. For example and without limitation, the signal processing module 830 may utilize a first decoder 832 to decode the received first signal. Also, the signal processing module 830 may perform other or additional processing tasks, for example, signal demodulation, digital detection (for digital signals), signal decoding, decrypting, decompressing, error detecting and correcting, etc. The scope of various aspects of the present invention should not be limited by characteristics of any particular manner of determining information from a signal or by characteristics of related apparatus.

The signal processing module 830 may, for example, determine a first indication of reliability for the unit of information determined from the received first signal. The signal processing module 830 may, for example and without limitation, share various functional characteristics with step 443 of the exemplary method 400 illustrated in FIG. 4 and discussed previously. For example, the signal processing module 830 may determine an indication of reliability in any of a variety of manners. Accordingly, the scope of various aspects of the present invention should not be limited by characteristics of any particular manner of (or apparatus for) determining an indication of reliability or degree of confidence in received information.

The exemplary signal processing module 830 may, for example, process the received second signal (e.g., as received by the second receiver module 824) to determine the unit of information by utilizing the unit of information determined from the first signal (e.g., as discussed above) to determine the unit of information from the second signal. The signal processing module 830 may, for example and without limitation, share various functional characteristics with step 444 of the exemplary method 400 illustrated in FIG. 4 and discussed previously. For example, the signal processing module 830 may perform such processing in any of a variety of manners. The following discussion will include various non-limiting exemplary illustrations, characteristics of which should not limit the scope of various aspects of the present invention.

In a first exemplary scenario, the signal processing module 830 may utilize the unit of information determined from the first signal as basis information, which may be modified in accordance with the unit of information determined from the second received signal. For example, if the unit of information (or a portion thereof) determined from the second received signal is different from a corresponding unit of information (or a portion thereof) determined from the first received signal, and the reliability of the unit of information determined from the second signal is relatively high, then the signal processing module 830 may determine that the unit of information (or a portion thereof) determined from the second signal outweighs the unit of information determined from the first signal.

In a second exemplary scenario, the signal processing module 830 may utilize the unit of information determined from the first signal as guide information, which may be utilized to adjust or influence the unit of information determined from the second received signal. For example, if the unit of information (or a portion thereof) determined from the second received signal is of relatively low reliability, then the signal processing module 830 may modify such information in accordance with the unit of information determined from the first received signal (e.g., particularly when reliability of the unit of information determined from the first received signal is relatively high).

As mentioned previously, the signal processing module 830 may, in various exemplary scenarios, utilize respective indications of reliability for the units of information determined from the first and second signals. Note, however, that the signal processing module 830 does not necessarily utilize such indications of reliability. For example and without limitation, the signal processing module 830 may utilize a predetermined algorithm for determining the unit of information from the second signal, based at least in part on the unit of information determined from the first signal, where such predetermined algorithm does not explicitly utilize a determination of information reliability.

In a non-limiting exemplary scenario, the signal processing module 830 may utilize an iterative approach to determining the unit of information from the first and second received signals. For example, the signal processing module 830 may utilize the unit of information determined from the second signal to further refine the unit of information determined from the first signal (e.g., utilizing an iterative processing approach). For example, the signal processing module 830 may determine a second indication of reliability for the unit of information determined from the second signal. The signal processing module 830 may then, in the exemplary scenario, utilize the unit of information determined from the second signal and the determined second indication of reliability to refine or re-determine the unit of information from the first signal.

In general, the signal processing module 830 may process the received second signal to determine the unit of information by utilizing the unit of information determined from the first signal to determine the unit of information from the second signal. Accordingly, the scope of various aspects of the present invention should not be limited by characteristics of any particular manner of making such determination.

The exemplary system 800 was presented to provide specific exemplary illustrations of generally broader aspects of the present invention. Accordingly, the scope of various aspects of the present invention should not be limited by characteristics of the exemplary system 800.

FIG. 9 is a diagram illustrating an exemplary communication system 900 that communicates information through multiple communication paths, in accordance with various aspects of the present invention. The communication system 900 may, for example and without limitation, share various characteristics with the exemplary communication system 610 illustrated in FIG. 6 and discussed previously. Also for example, components of the communication system 900 may share various functional characteristics with the exemplary method 500 illustrated in FIG. 5 and discussed previously.

The exemplary communication system 900 may comprise a communication interface module 920 and a signal processing module 930. The communication interface module 920 may comprise a first transmitter module 922 and a second (or Nth) transmitter module 924. The communication interface module 920 may, for example and without limitation, share various characteristics with the communication interface module 620 illustrated in FIG. 6 and discussed previously. Also for example, the communication interface module 920 may share various functional characteristics with steps 540 and 550 of the exemplary method 500 illustrated in FIG. 5 and discussed previously.

The signal processing module 930 may, for example and without limitation, share various functional characteristics with steps 520 and 530 of the exemplary method 500 illustrated in FIG. 5 and discussed previously. For example, the signal processing module 930 may determine a first set of information representative of a unit of information. The first set of information may be representative of the unit of information in any of a variety of ways. For example and without limitation, the first set of information may correspond exactly to the unit of information. Also for example, the first set of information may comprise a compressed, encoded or encrypted version of the unit of information. Accordingly, the scope of various aspects of the present invention should not be limited by any particular manner in which a set of information may represent a unit of information.

The signal processing module 930 may determine the first set of information in any of a variety of manners. For example and without limitation, the signal processing module 930 may compress data representative of the unit of information. The signal processing module 930 may, for example, perform such compression in any of a variety of manners and/or in accordance with any of a variety of compression standards. Also for example, the signal processing module 930 may encode or encrypt information representative of the unit of information. The scope of various aspects of the present invention should not be limited by characteristics of any particular manner of determining a set of information that is representative of a particular unit of information.

The signal processing module 930 may also, for example, determine a second set of information representative of the unit of information. For example, the second set of information may be identical to the first set of information. Also for example, the second set of information may be different than the first set of information. For example and without limitation, the second set of information might comprise a compressed representation of the unit of information, while the first set of information might comprise an exact representation of the unit of information or a different compressed representation than the second set of information. Also for example, the second and first sets of information may be encoded or encrypted differently. Further for example, the second and first sets of information may represent the unit of information at different respective resolution levels (e.g., data point, spatial and/or temporal resolution levels).

Note that the first and second sets of information may comprise or be communicated with any of a variety of additional information (e.g., information not directly representative of the unit of information). For example and without limitation, such additional information may comprise information identifying the unit of information (or portion thereof) that is represented. For example, such additional information may also comprise timestamp or sequence information. In a non-limiting exemplary scenario, the first and second sets of information may be sub-divided into one or more data frames or packets, each of which comprises header information. Continuing the non-limiting exemplary scenario, respective headers of the first and second sets of information may comprise information that may be utilized to synchronize or correlate the first and second sets of information. For example, the first and second sets of information may comprise at least some common header information. Continuing the non-limiting exemplary scenario, respective headers of the first and second sets of information may comprise common source and/or destination information.

In general, the first and second sets of information may comprise or be communicated with any of a variety of additional information. Accordingly, the scope of various aspects of the present invention should not be limited by characteristics of any particular type of additional information.

In general, the signal processing module 930 may determine first and second sets of information representative of the unit of information. Accordingly, the scope of various aspects of the present invention should not be limited by characteristics of a particular manner in which a unit of information may be represented or by any particular manner of determining a set of information that is representative of a particular unit of information.

The signal processing module 930 may utilize the communication interface module 920 (e.g., the first transmitter module 922) to communicate the first set of information in a first signal communicated directly to (and through) a first communication network. The first communication network may, for example, be communicatively coupled to one or more other communication systems to which the first signal may be communicated. Various characteristics of signals and networks were discussed previously with regard to the discussion of FIG. 2.

Referring briefly to the exemplary communication environment 600 illustrated in FIG. 6, the communication system 610 may communicate a first signal to the second system 690. For example, the communication interface module 620 may communicate the first signal directly to the first communication network 640 through communication link 644, where the first communication network 640 may then communicate the first signal to the second system 690 through communication link 642.

As discussed previously, in general, the first signal may comprise characteristics of any of a variety of communication signal types, and the first communication network may comprise characteristics of any of a variety of communication network types. Accordingly, the scope of various aspects of the present invention should not be limited by characteristics of any particular signal type or type of communication network.

As discussed previously, the signal processing module 930 may utilize the first transmitter module 922 to communicate the first set of information in a first signal. The first transmitter module 922 may comprise characteristics of any of a variety of transmitter types. For example and without limitation, the transmitter may comprise characteristics of a wired, wireless or optical transmitter. Also for example, the first transmitter module 922 may be adapted to communicate information communicated utilizing any of a variety of communication protocols or standards. The first transmitter module 922 may, for example, be associated with an antenna (or other signal port) coupled to the first transmitter module 922. The scope of various aspects of the present invention should not be limited by characteristics of any particular type of transmitter or other apparatus that may transmit a signal that communicates information.

The signal processing module 930 may utilize the communication interface module 920 (e.g., the second transmitter module 924) to communicate the second set of information in a second signal communicated directly to (and through) a second communication network (e.g., substantially different from the first communication network). The second communication network may, for example, be communicatively coupled to one or more other communication systems to which the second signal may be communicated. Non-limiting exemplary characteristics of various signal and communication network types were presented previously.

Referring briefly to the exemplary communication environment 600 illustrated in FIG. 6, the communication system 610 may communicate a second signal to the second system 690. For example, the communication interface module 620 may communicate the second signal directly to the second communication network 650 through communication link 652. The second communication network 650 may then communication the second signal to the second system 690 through any of a plurality of paths (e.g., through communication link 654, the first communication network 640 and communication link 642; or through communication link 656, the third communication network 660 and communication link 662).

As discussed previously, the signal processing module 930 may utilize the second transmitter module 924 to communicate the second set of information in a second signal. The second transmitter module 924 may comprise characteristics of any of a variety of transmitter types. For example and without limitation, the second transmitter module 924 may comprise characteristics of a wired, wireless or optical transmitter. Also for example, the second transmitter module 924 may be adapted to communicate information utilizing any of a variety of communication protocols or standards. The second transmitter module 924 may, for example, be independent of the first transmitter module 922. Alternatively, for example, the second transmitter module 924 may share one or more components with the first transmitter module 922. The second transmitter module 924 may, for example, be associated with an antenna (or other signal port) coupled to the second transmitter module 924. The scope of various aspects of the present invention should not be limited by characteristics of any particular type of transmitter or other apparatus that may transmit a signal that communicates information.

Generally, the signal processing module 930 may utilize the communication interface module 920 to communicate the first set of information in a first signal communicated directly to a first communication network and to communicate the second set of information in a second signal communicated directly to a second communication network. Accordingly, the scope of various aspects of the present invention should not be limited by characteristics of any particular type of signal, type of communication network or type of transmitter.

The exemplary communication system 900 illustrated in FIG. 9 and discussed above was presented to provide specific examples of generally broader aspects of the present invention. Accordingly, the scope of various aspects of the present invention should not be limited by specific characteristics of the exemplary communication system 900.

In summary, various aspects of the present invention provide a system and method for utilizing multiple independent communication pathways for a communication. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. In a communication system, a method for receiving information, the method comprising:
   in a portable communication device:
      receiving a first signal directly from a first communication network utilizing a first communication protocol, the first signal communicating a unit of information from a source device, where the first communication network comprises at least a portion of a first communication pathway that extends from the source device to the portable communication device and communicatively couples the source device and the portable communication device;
      receiving a second signal directly from a second communication network independent of the first communication network, utilizing a second communication protocol different from the first communication protocol, the second signal communicating the unit of information from the source device, where the second communication network comprises at least a portion of a second communication pathway that extends from the source device to the portable communication device and communicatively couples the source device and the portable communication device, the second communication pathway operating independent of the first communication pathway; and
      processing the received first signal and the received second signal to determine the unit of information, wherein processing the received first signal and the received second signal to determine the unit of information comprises:
      processing the received first signal to determine the unit of information;
      determining a first indication of reliability for the unit of information determined from the received first signal;
      processing the received second signal to determine the unit of information;
      determining a second indication of reliability for the unit of information determined from the received second signal; and
      determining the unit of information by utilizing the unit of information determined from the received second signal and the second indication of reliability to re-determine the unit of information from the received first signal.

2. The method of claim 1, wherein processing the received first and the received second signal to determine the unit of information comprises selecting either the unit of information determined from the received first signal or the unit of information determined from the received second signal based, at least in part, on the first and second indications of reliability.

3. The method of claim 1, wherein processing the received first and the received second signal to determine the unit of information comprises determining the unit of information based, at least in part, on:
the unit of information determined from the received first signal;
the first indication of reliability;
the unit of information determined from the received second signal; and
the second indication of reliability.

4. The method of claim 1, wherein processing the received first and the received second signal to determine the unit of information comprises determining the unit of information based, at least in part, on a weighted average determined from at least:
the unit of information determined from the received first signal;
the first indication of reliability;
the unit of information determined from the received second signal; and
the second indication of reliability.

5. The method of claim 1, wherein the first communication network is a telecommunication network and the second communication network is a computer network.

6. The method of claim 1, wherein the second communication network is communicatively coupled to the first communication network.

7. The method of claim 1, wherein the first signal is encoded using a first encoding strategy, and the second signal is encoded using a second encoding strategy different from and independent of the first encoding strategy.

8. The method of claim 1, wherein processing the received first signal and the received second signal to determine the unit of information comprises:
processing the received first signal to determine the unit of information; and
processing the received second signal to determine the unit of information by utilizing the unit of information determined from the received first signal to determine the unit of information from the received second signal.

9. The method of claim 8, further comprising determining a first indication of reliability for the unit of information determined from the received first signal, and wherein processing the received second signal to determine the unit of information comprises utilizing the unit of information determined from the received first signal and the determined first indication of reliability to determine the unit of information from the received second signal.

10. In a communication system, a method for receiving information, the method comprising:
in a portable communication device:
receiving a first signal directly from a first communication network utilizing a first communication protocol, the first signal communicating a unit of information from a source device, where the first communication network comprises at least a portion of a first communication pathway that communicatively couples the source device and the portable communication device;
receiving a second signal directly from a second communication network independent of the first communication network, utilizing a second communication protocol different from the first communication protocol, the second signal communicating the unit of information from the source device, where the second communication network comprises at least a portion of a second communication pathway that communicatively couples the source device and the portable communication device, the second communication pathway operating independent of the first communication pathway; and
processing the received first signal and the received second signal to determine the unit of information, wherein said processing comprises:
processing the received first signal to determine the unit of information;
determining a first indication of reliability for the unit of information determined from the received first signal;
processing the received second signal to determine the unit of information by utilizing the unit of information determined from the received first signal and the determined first indication of reliability to determine the unit of information from the received second signal;
determining a second indication of reliability for the unit of information determined from the received second signal; and
utilizing the unit of information determined from the received second signal and the second indication of reliability to re-determine the unit of information from the received first signal.

11. A portable communication device operable to receive information from a plurality of communication networks, the portable communication device comprising:
a communication interface module operable to, at least:
receive a first signal directly from a first communication network, the first signal communicating a unit of information from a source device, where the first communication network comprises at least a portion of a first communication pathway that extends from the source device to the portable communication device and communicatively couples the source device and the portable communication device; and
receive a second signal directly from a second communication network, the second signal communicating the unit of information from the source device, where the second communication network comprises at least a portion of a second communication pathway that extends from the source device to the portable communication device communicatively couples the source device and the portable communication device, the second communication pathway operating independent of the first communication pathway; and
a processing module operable, to at least, process the received first signal and the received second signal to determine the unit of information by, at least in part, operating to:
process the received first signal to determine the unit of information;
determine a first indication of reliability for the unit of information determined from the received first signal;
process the received second signal to determine the unit of information;
determine a second indication of reliability for the unit of information determined from the received second signal; and
determine the unit of information based, at least in part, on utilizing the unit of information determined from the received second signal and the second indication of reliability to re-determine the unit of information from the received first signal.

12. The portable communication device of claim 11, wherein the communication interface module comprises a first receiver module and a second receiver module, and the processing module comprises a first decoder corresponding to the first receiver module and a second decoder corresponding to the second receiver module.

13. The portable communication device of claim 11, wherein the processing module operates to determine the unit of information based, at least in part, on the determined first and second indications of reliability by, at least in part, operating to select either the unit of information determined from the received first signal or the unit of information determined from the received second signal based, at least in part, on the first and second indications of reliability.

14. The portable communication device of claim 11, wherein the processing module operates to determine the unit of information based, at least in part, on the determined first and second indications of reliability by, at least in part, operating to determine the unit of information based, at least in part on:
the unit of information determined from the received first signal;
the first indication of reliability;
the unit of information determined from the received second signal; and
the second indication of reliability.

15. The portable communication device of claim 11, wherein the processing module operates to determine, the unit of information based, at least in part, on the determined first and second indications of reliability by, at least in part, operating to determine the unit of information based, at least in part, on a weighted average determined from at least:
the unit of information determined from the received first signal;
the first indication of reliability;
the unit of information determined from the received second signal; and
the second indication of reliability.

16. The portable communication device of claim 11, wherein the first communication network is a telecommunication network and the second communication network is a computer network.

17. The portable communication device of claim 11, wherein the second communication network is communicatively coupled to the first communication network.

18. The portable communication device of claim 11, wherein the first signal is encoded using a first encoding strategy, and the second signal is encoded using a second encoding strategy different from and independent of the first encoding strategy.

19. The portable communication device of claim 11, wherein the processing module is operable to process the received first signal and the received second signal to determine the unit of information by, at least in part, operating to:
process the received first signal to determine the unit of information; and
process the received second signal to determine the unit of information by utilizing the unit of information determined from the first signal to determine the unit of information from the second signal.

20. The portable communication device of claim 19, wherein the processing module operates to process the received first signal and the received second signal to determine the unit of information by, at least in part, operating to:
determine a first indication of reliability for the unit of information determined from the first signal; and
utilize the unit of information determined from the first signal and the first indication of reliability to determine the unit of information from the second signal.

21. A portable communication device operable to receive information from a plurality of communication networks, the portable communication device comprising:
a communication interface module operable to, at least:
receive a first signal directly from a first communication network, the first signal communicating a unit of information from a source device, where the first communication network comprises at least a portion of a first communication pathway that communicatively couples the source device and the portable communication device; and
receive a second signal directly from a second communication network, the second signal communicating the unit of information from the source device, where the second communication network comprises at least a portion of a second communication pathway that communicatively couples the source device and the portable communication device, the second communication pathway operating independent of the first communication pathway; and
a processing module operable, to at least, process the received first signal and the received second signal to determine the unit of information by, at least in part, operating to:
process the received first signal to determine the unit of information;
determine a first indication of reliability for the unit of information determined from the received first signal; and
process the received second signal to determine the unit of information by utilizing the unit of information determined from the received first signal and the determined first indication of reliability to determine the unit of information from the received second signal;
determine a second indication of reliability for the unit of information determined from the received second signal; and
utilize the unit of information determined from the received second signal and the second indication of reliability to re-determine the unit of information from the received first signal.

22. The portable communication device of claim 11, wherein the communication interface module and the processing module share a sub-module.

23. The method of claim 1, wherein the first communication pathway and the second communication pathway are completely separate from each other.

24. The portable communication device of claim 11, where the first communication pathway and the second communication pathway are completely separate from each other.

25. In a communication system, a method for receiving information, the method comprising:
in a portable communication device:
receiving a first signal directly from a first communication network utilizing a first communication protocol, the first signal communicating a unit of information from a source device, where the first communication network comprises at least a portion of a first communication pathway that communicatively couples the source device and the portable communication device;
receiving a second signal directly from a second communication network independent of the first communication network, utilizing a second communication protocol different from the first communication protocol, the second signal communicating the unit of information from the source device, where the second communication network comprises at least a portion of a second communication pathway that communicatively couples the source device and the portable communication device, the second communication pathway operating independent of the first communication pathway; and processing the received first signal and the received second signal to determine the unit of information, wherein said processing comprises:

processing the received first signal to determine the unit of information;

determining a first indication of reliability for the unit of information determined from the received first signal;

processing the received second signal to determine the unit of information;

determining a second indication of reliability for the unit of information determined from the received second signal; and determining the unit of information based, at least in part, on at least one of:

a weighted average determined from at least:
  the unit of information determined from the received first signal;
  the first indication of reliability;
  the unit of information determined from the received second signal; and
  the second indication of reliability; and utilizing the unit of information determined from the received second signal and the second indication of reliability to re-determine the unit of information from the received first signal.

26. A portable communication device operable to receive information from a plurality of communication networks, the portable communication device comprising:

a communication interface module operable to, at least:
  receive a first signal directly from a first communication network, the first signal communicating a unit of information from a source device, where the first communication network comprises at least a portion of a first communication pathway that communicatively couples the source device and the portable communication device; and receive a second signal directly from a second communication network, the second signal communicating the unit of information from the source device, where the second communication network comprises at least a portion of a second communication pathway that communicatively couples the source device and the portable communication device, the second communication pathway operating independent of the first communication pathway; and a processing module operable, to at least, process the received first signal and the received second signal to determine the unit of information by, at least in part, operating to:

process the received first signal to determine the unit of information;

determine a first indication of reliability for the unit of information determined from the received first signal;

process the received second signal to determine the unit of information;

determine a second indication of reliability for the unit of information determined from the received second signal; and determine the unit of information based, at least in part, on at least one of:

a weighted average determined from at least:
  the unit of information determined from the received first signal;
  the first indication of reliability;
  the unit of information determined from the received second signal; and
  the second indication of reliability; and utilizing the unit of information determined from the received second signal and the second indication of reliability to re-determine the unit of information from the received first signal.

* * * * *